(12) United States Patent
Nieuwoudt

(10) Patent No.: US 11,260,317 B2
(45) Date of Patent: Mar. 1, 2022

(54) MASS TRANSFER ASSEMBLY AND COLUMN WITH DIVIDING WALL AND METHODS INVOLVING SAME

(71) Applicant: Koch-Glitsch, LP, Wichita, KS (US)

(72) Inventor: Izak Nieuwoudt, Wichita, KS (US)

(73) Assignee: Koch-Glitsch, LP, Wichita, KS (US)

( * ) Notice: Subject to any disclaimer, the term of this patent is extended or adjusted under 35 U.S.C. 154(b) by 0 days.

(21) Appl. No.: 16/761,072

(22) PCT Filed: Nov. 14, 2018

(86) PCT No.: PCT/IB2018/058937
§ 371 (c)(1),
(2) Date: May 1, 2020

(87) PCT Pub. No.: WO2019/097408
PCT Pub. Date: May 23, 2019

(65) Prior Publication Data
US 2021/0178282 A1   Jun. 17, 2021

Related U.S. Application Data

(60) Provisional application No. 62/585,851, filed on Nov. 14, 2017.

(51) Int. Cl.
*B01D 3/14* (2006.01)
*B01D 3/30* (2006.01)
*B01D 3/32* (2006.01)
*B01D 3/42* (2006.01)
*B01D 3/20* (2006.01)

(52) U.S. Cl.
CPC .............. *B01D 3/141* (2013.01); *B01D 3/20* (2013.01); *B01D 3/4211* (2013.01); *B01D 3/30* (2013.01); *B01D 3/324* (2013.01)

(58) Field of Classification Search
CPC .......... B01D 3/141; B01D 3/163; B01D 3/32; B01D 3/324; B01D 3/14; B01D 3/30
See application file for complete search history.

(56) References Cited

U.S. PATENT DOCUMENTS 4,167,475 A * 9/1979 Winter, III ............... B01D 3/14 196/132
4,230,533 A * 10/1980 Giroux ................. B01D 3/4255 203/1
4,673,464 A * 6/1987 Zeitsch .................... B01D 3/22 202/158

(Continued)

FOREIGN PATENT DOCUMENTS

CN 201832434 U 5/2011
CN 102872609 A 1/2013
(Continued)

OTHER PUBLICATIONS

International Search Report and Written Opinion received for PCT patent application No. PCT/IB2018/058937, dated Feb. 19, 2019, 10 pages.

*Primary Examiner* — Jonathan Luke Pilcher

(57) ABSTRACT

A mass transfer assembly has at least one dividing wall, zones of mass transfer structures on opposite sides of the dividing wall, and a vapor flow restrictor that is operable to vary the split of vapor ascending through the zones of mass transfer structures on the opposite sides of the dividing wall.

19 Claims, 28 Drawing Sheets

(56) References Cited

U.S. PATENT DOCUMENTS

| | | | |
|---|---|---|---|
| 6,558,515 B1 | 5/2003 | Steacy | |
| 8,562,792 B2 | 10/2013 | King | |
| 2015/0119612 A1* | 4/2015 | Agrawal | ............... B01D 3/141 |
| | | | 585/16 |
| 2016/0263492 A1 | 9/2016 | Gao | |

FOREIGN PATENT DOCUMENTS

| | | |
|---|---|---|
| CN | 103691144 A | 4/2014 |
| CN | 203620278 U | 6/2014 |
| CN | 204601655 U | 9/2015 |
| CN | 105498268 A | 4/2016 |
| CN | 205145640 U | 4/2016 |
| GB | 518983 A | 3/1940 |
| KR | 101709754 B1 | 2/2017 |
| WO | 2016016301 A1 | 2/2016 |

\* cited by examiner

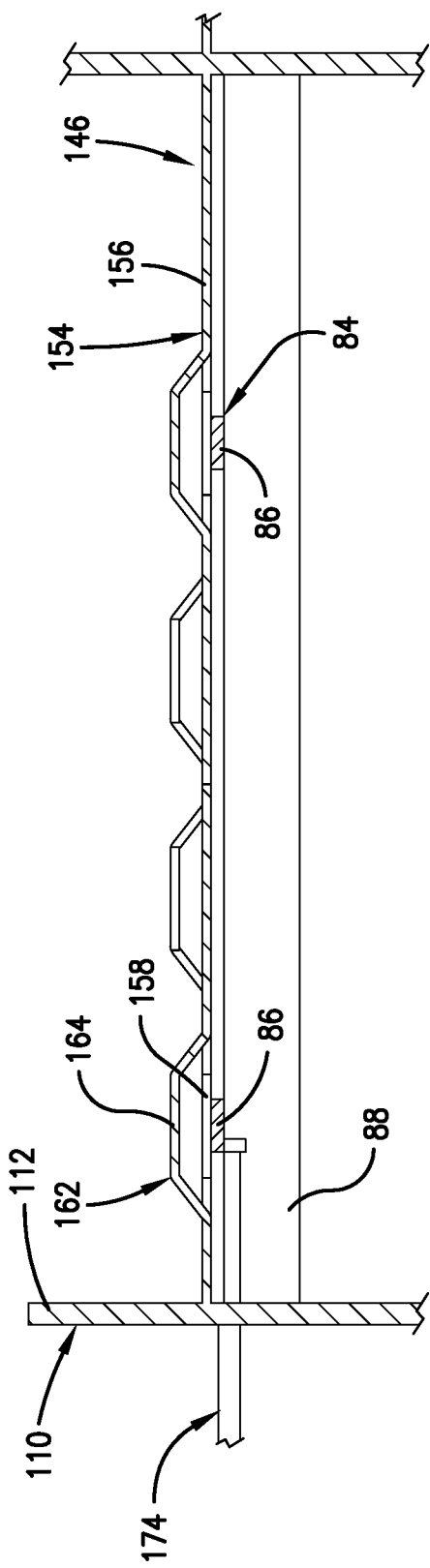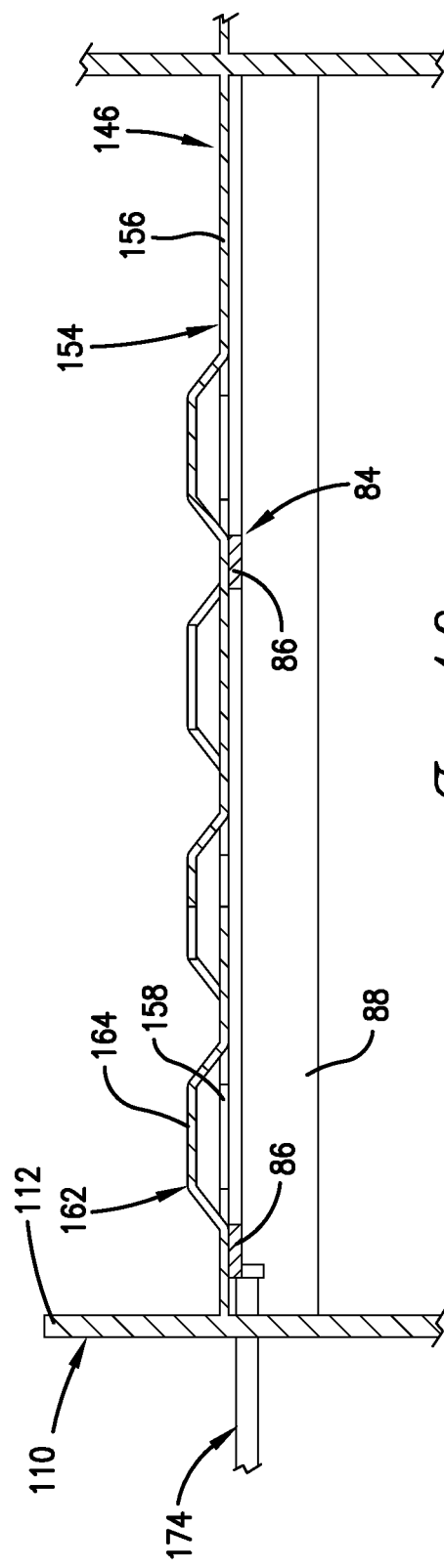

US 11,260,317 B2

MASS TRANSFER ASSEMBLY AND COLUMN WITH DIVIDING WALL AND METHODS INVOLVING SAME

CROSS-REFERENCE TO RELATED APPLICATIONS

This application is a filing under 35 U.S.C. 371 as the National Phase of International Patent Application No. PCT/IB2018/058937, filed on Nov. 14, 2018, which claims the benefit of and priority to U.S. Provisional Application No. 62/585,851, filed on Nov. 14, 2017, both of which are incorporated herein by reference in their entirety.

BACKGROUND

The present invention relates generally to mass transfer columns and, more particularly, to mass transfer columns known as dividing wall columns and methods of using the same, such as for the separation of three or more component mixtures.

Mass transfer columns are configured to contact at least two fluid streams in order to provide product streams of specific composition and/or temperature. The term "mass transfer column," as used herein is intended to encompass columns in which mass and/or heat transfer is the primary objective. Some mass transfer columns, such as those utilized in multicomponent distillation and absorption applications, contact a gas-phase stream with a liquid-phase stream, while others, such as extraction columns, may be designed to facilitate contact between two liquid phases of different densities. Oftentimes, mass transfer columns are configured to contact an ascending vapor or liquid stream with a descending liquid stream, usually along or above the surfaces of mass transfer structures that are placed in the interior region of the column to facilitate intimate contact between the two fluid phases. The rate and/or degree of mass and heat transferred between the two phases is enhanced by these mass transfer structures, which may be in the form of various types of trays, structured packing, random packing, or grid packing.

In one type of mass transfer column sometimes referred to as a dividing wall column, one or more vertically-extending dividing walls are positioned within an open internal region within the mass transfer column to allow for separation of a three or more component feedstream within the mass transfer column. As an example, when separating a three component feedstream, a single dividing wall is normally centrally positioned in a middle section of the mass transfer column and extends in a chordal fashion from opposite sides of the mass transfer column. The feedstream is introduced through the shell on one side of the dividing wall and a side draw-off extends through the shell at an opposite side of the dividing wall.

The feedstream is separated into low boiling and heavy boiling fractions on the feed side of the dividing wall, with some of the mid-boiling fraction accompanying the low boiling fraction into an upper section of the mass transfer column and the remainder of the mid-boiling fraction descending with the heavy boiling fraction to a lower section of the mass transfer column. The low boiling fraction is separated from the mid-boiling fraction in the upper section of the mass transfer column and, to a lesser extent, on the draw-off side of the dividing wall and is recovered as the overhead product at the top of the shell. The high boiling fraction is separated from the mid-boiling fraction in the lower section of the mass transfer column, and to a lesser extent, on the thermally-coupled, draw-off side of the dividing wall and is recovered as the bottom product in the sump. The separated mid-boiling fraction is delivered from the upper and lower sections of the mass transfer column to the draw-off side of the dividing wall in the middle section of the mass transfer column and is recovered through the side draw-off. The dividing wall thus allows for the distillation separation of the three component feedstream into three high-purity fractions. Additional dividing walls can be used for the separation of four or more component feedstreams. The dividing wall may also be used in mass transfer columns in which azeotropic, extractive and reactive distillation processes are occurring.

The use of a dividing wall in a mass transfer column is advantageous in that it may eliminate the need for additional mass transfer columns to achieve the same processing that the dividing wall allows to occur in a single mass transfer column, with resulting savings in investment and operating costs. However, a number of design and operational challenges are presented by the use of the dividing wall in the mass transfer columns. One of these challenges involves controlling the split of vapor ascending from the lower section of the mass transfer column to the feed side and to the draw-off side of the dividing wall. Various design approaches have been suggested for fixing the split of vapor between the feed and draw-off sides of the dividing wall, but further improvements are needed in the ability to control and adjust the vapor split to provide increased operational flexibility and control of the distillation processes occurring within the mass transfer column.

BRIEF DESCRIPTION OF THE DRAWINGS

In the accompanying drawings that form part of the specification and in which like numbers are used to indicate like components in the various views:

FIG. 17 is a fragmentary side elevation view of the mass transfer column and mass transfer assembly shown in FIG. 16 and taken along the line segments 17-17 in FIG. 16;

FIG. 18 is a fragmentary side elevation view of the mass transfer column and mass transfer assembly shown in FIG. 17, but with the vapor flow restrictor repositioned to a different orientation from that shown in FIG. 17;

SUMMARY

In one aspect, the invention is directed to a mass transfer assembly for use in an open internal region within a mass transfer column, the mass transfer assembly comprising a dividing wall, one or more zones of mass transfer structures positioned on opposite first and second sides of the dividing wall, and a vapor flow restrictor positioned in the first sub-region. The vapor flow restrictor is moveable between a first orientation that causes a first vapor flow resistance through the first sub-region and a second orientation that causes a second vapor flow resistance through the sub-region that is greater than the first vapor flow resistance to allow an adjustment of a volumetric split of vapor when ascending through the first and second sub-regions on the opposite sides of the dividing wall. In one embodiment, the first vapor flow resistance through the first sub-region is less than or the same as a vapor flow resistance through the second sub-region on the opposite side of the dividing wall and the second vapor flow resistance is greater than the vapor flow resistance through the second sub-region on the opposite side of the dividing wall.

In another aspect, the invention is directed to a mass transfer column comprising a shell, an open internal region defined by said shell, and a mass transfer assembly as described above that is positioned within said open internal region.

In a further aspect, the invention is directed to a method of the mass transfer column described above. The method comprises the steps of operating an actuator to move the vapor flow restrictor positioned in the first sub-region between a first orientation that causes a first vapor flow resistance through the first sub-region and a second orientation that causes a second vapor flow resistance through the sub-region that is greater than the first vapor flow resistance to adjust a volumetric split of vapor when ascending through the first and second sub-regions on the opposite sides of the dividing wall, introducing a feedstream into the open internal region, processing the feedstream to cause vapor to ascend through the first and second sub-regions, and withdrawing a product or product from the mass transfer column.

DETAILED DESCRIPTION

Figure 1A:
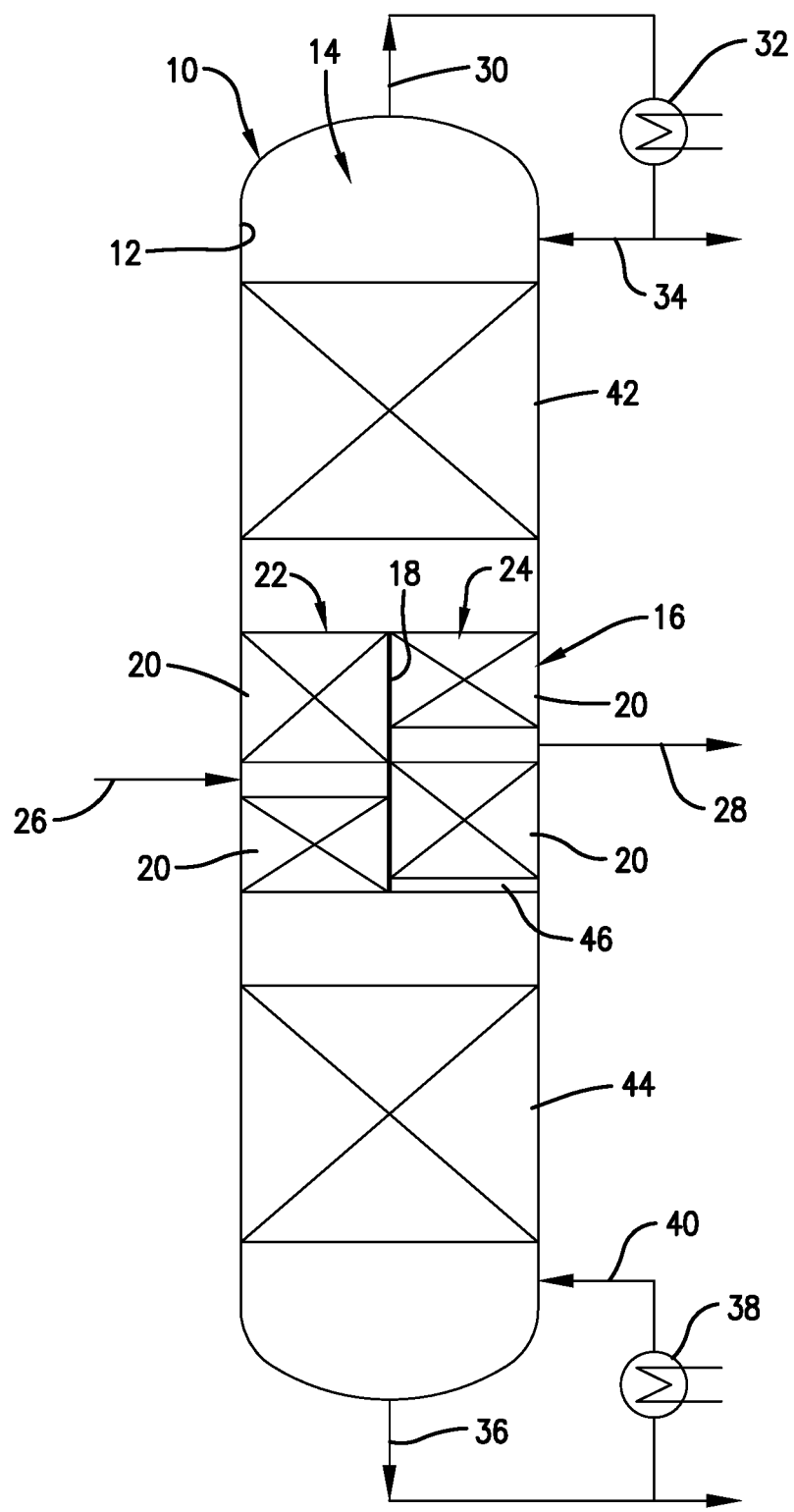
FIG. 1a is a schematic side elevation view of a mass transfer column showing a dividing wall and schematically-represented components positioned within an open internal region within the mass transfer column.

Turning now to the drawings in greater detail and initially to FIG. 1a, a mass transfer column suitable for use in mass transfer and heat exchange processes is shown somewhat schematically and is represented generally by the numeral 10. The mass transfer column 10 includes an upright, external shell 12 that is generally cylindrical in configuration, although other configurations, including polygonal, are possible and are within the scope of the present invention. The shell 12 is of any suitable diameter and height and is constructed from one or more rigid materials that are desirably inert to, or are otherwise compatible with, the fluids and conditions present during operation of the mass transfer column 10.

The shell 12 of the mass transfer column 10 defines an open internal region 14 in which the desired mass transfer and/or heat exchange between the fluid streams occurs. A mass transfer assembly 16 comprising one or more dividing walls 18 and one or more zones 20 of mass transfer structures is positioned within the open internal region 14. A single dividing wall 18 is shown in FIG. 1a and it extends in a chordal fashion from one side of the shell 12 to an opposite side of the shell 12. The dividing wall 18 may be formed as a single sheet of material or by joining together individual panels. The dividing wall 18 may be fixed to the shell 12, such as by using bolting bars or by welding, or it may be unfixed and supported by a beam or other structures, including the mass transfer structures.

The dividing wall 18 is shown extending in a vertical plane that intersects a center vertical axis of the shell 12. As shown, the dividing wall 18 bisects the open internal region 14 and forms two sub-regions 22 and 24 on opposite sides of the dividing wall 18 that are of equal cross-sectional area. When the shell 12 is of a cylindrical shape, the sub-regions 22 and 24 on the opposite sides of the dividing wall 18 are of a hemispheric shape. In other embodiments, the dividing wall 18 may be offset from the center vertical axis of the shell 12 so that the regions 22 and 24 on the opposite sides of the dividing wall 18 are of unequal cross-sectional areas. The dividing wall 18 need not extend in a single plane. In some embodiments, the dividing wall 18 may have segments that are in different vertical planes that are interconnected by a sloping segment. In other embodiments, the dividing wall 18 may have spaced-apart segments that are in the same vertical plane and are only partially connected or completely unconnected to each other.

A feedstream 26 is delivered through a nozzle (not shown) in the shell 12 of the mass transfer column 10 into the open internal region 14, such as into the sub-region 22 on one side of the dividing wall 18. The feedstream 26 may be one that contains multiple components that are intended to be separated from each other by processing that occurs within the mass transfer column 10. A side draw-off 28 is removed from the open internal regions 14, such as from the sub-region 24 on the opposite side of the dividing wall 18, through another nozzle (not shown) in the shell 12. The feedstream 26 may be directed radially into the mass transfer column 10. The side draw-off 28 may similarly be removed from the mass transfer column 10 in a radial direction. Other fluid streams may be directed into the mass transfer column 10 through any number of feed nozzles (not shown) positioned at appropriate locations along the height of the mass transfer column 10. Similarly, other side draw-offs may be removed from the mass transfer column 10 through any number of side draw-off nozzles (not shown) positioned at appropriate locations. One or more vapor streams can also be generated within the mass transfer column 10 rather than being introduced into the column 10 through the feed lines.

The mass transfer column 10 also includes an overhead product line 30 at the top of the shell 12 for removing a vapor product or byproduct. A condenser 32 and a reflux return line 34 may be provided in communication with the overhead product line 30 to return a portion of the vapor product or byproduct in liquid form to the mass transfer column 10. A bottom stream takeoff line 36 is provided at the bottom of the shell 12 for removing a liquid product or byproduct from the mass transfer column 10. A reboiler 38 and a vapor return line 40 may be provided to return a portion of the liquid product or byproduct in vapor form to the mass transfer column 10.

The dividing wall 18 may be positioned at various elevations within the open internal region 14 of the mass transfer column 10. The dividing wall 18 is shown in FIG. 1a positioned within a middle section of the mass transfer column 10. In other embodiments, the dividing wall 18 is positioned in an upper section or in a lower section of the mass transfer column 10. The height of the dividing wall 18 can be varied to achieve the process operations designed to occur within the mass transfer column 10.

The number and vertical extent of the zones 20 of the mass transfer structures in the sub-regions 22 and 24 may be varied depending on the type of processes intended to occur within the mass transfer column 10. Other zones 42 and 44 containing mass transfer structures may be positioned in the upper section and lower section, respectively, of the mass transfer column 10. The mass transfer structures may be in the form of cross-flow or other types of trays or packing. The packing may be structured packing, random packing, and/or grid packing. The mass transfer structures need not be of the same type in all of the zones 20, 42, and 44. For example, some of the zones 20 may be of one type of mass transfer structures, while other ones of the zones 20 are of other types of mass transfer structures. Likewise, the mass transfer structures in the zone 42 need not be the same as the mass transfer structures in the zone 44 or the zones 20. One or more or all of the zones 20, 42, and 44 may additionally include other internals such as liquid collectors, liquid distributors, and grid supports.

At least one of the sub-regions 22 or 24 includes a vapor flow restrictor 46 that is operable to increase or decrease the resistance to vapor flow through the sub-region 22 or 24 with which it is associated so that the resistance to flow becomes greater than or less than the resistance to vapor flow through the sub-region 22 or 24 on the opposite side of the dividing wall 18. The vapor flow restrictor 46 is thus operable to vary the volumetric split of vapor ascending in the open internal region 14 through the sub-regions 22 and 24 on the opposite sides of the dividing wall 18. For example, the vapor flow restrictor 46 can be operated to cause more volumetric flow of vapor through the sub-region 22 than through the sub-region 24, or more volumetric flow through the sub-region 24 than through the sub-region 22. Only one of the vapor flow restrictors 46 is shown in FIGS. 1a and 1t is associated with the sub-region 22 on the feed side of the dividing wall 18. It may alternatively be associated with the sub-region 24 on the draw-off side of the dividing wall 18 or one of the vapor flow restrictors 46 may be associated with sub-region 22 and another one of the vapor flow restrictors 46 may be associated with sub-region 24. While the vapor flow restrictor 46 is shown positioned at a lower end of the sub-region 22, it may alternatively be placed at a top end of the sub-region 22 or at a location between the lower and top ends. The vapor flow restrictor 46 may likewise be placed above, below or within the zones 20 of mass transfer structures.

In one embodiment, the vapor flow restrictor 46 is moveable between a first orientation that causes the vapor flow resistance through the associated sub-region 22 to be less than that through the sub-region 24 on the opposite side of the dividing wall 18 to a second orientation in which the vapor flow restrictor 46 causes the vapor flow resistance through the associated sub-region 22 to be greater than that through the sub-region 24 on the opposite side of the dividing wall 18. In another embodiment, the vapor flow restrictor 46 when in the first orientation causes the vapor flow resistance through the associated sub-region 22 to be generally the same as that through the sub-region 24 on the opposite side of the dividing wall 18 and when in the second orientation causes the vapor flow resistance through the associated sub-region 22 to be greater than that through the sub-region 24 on the opposite side of the dividing wall 18.

Figure 1B:
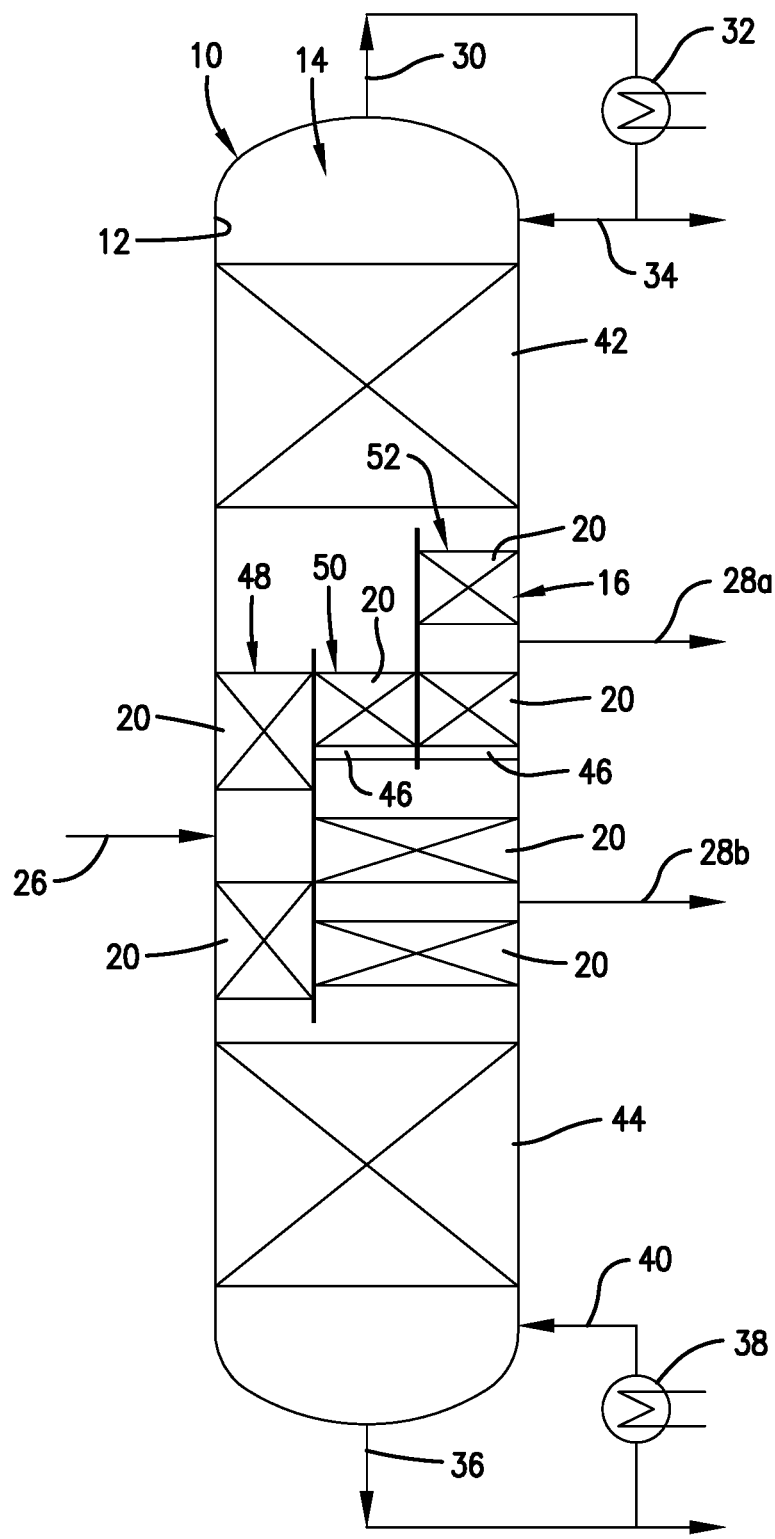
FIG. 1b is a schematic side elevation view of a mass transfer column similar to that shown in FIG. 1a but showing two dividing walls positioned within the open internal region within the mass transfer column.

When two or more dividing walls 18 are used, the number of sub-regions formed by dividing walls 18 will normally be one more than the number of dividing walls 18 and the minimum number of vapor flow restrictors 46 will be the same as the number of dividing walls 18. An example of the use of two dividing walls 18a and 18b in the mass transfer column 10 is shown in FIG. 1b. The dividing walls 18a and 18b extend in parallel relationship to each other and are horizontally spaced apart. The dividing walls 18a and 18b may be of the same construction as the dividing wall 18 previously described. The dividing walls 18a and 18b are shown vertically staggered and partially overlapping with respect to each other. In other embodiments, the dividing walls 18a and 18b may be vertically staggered without any overlap or they may be coextensive with each other.

The dividing walls 18a and 18b divide the open internal region 14 of the mass transfer column 10 into three sub-regions 48, 50 and 52. The sub-regions 48, 50 and 52 may be of the same or differing cross-sectional area. One or more zones 20 containing the mass transfer structures and optional other internals are positioned within the sub-regions 48, 50 and 52. Vapor flow restrictors 46 are shown associated with zones 50 and 52, but may alternatively be associated with any two or all three of the zones 48, 50 and 52. One or more of the zones 20 containing the mass transfer structures and optional other internals may also span across two or all of the sub-regions 48, 50 and 52. Two of the side draw-offs 28a and 28b may be used to withdraw different products or byproducts from within the open internal region 14, such as from the sub-region 52.

Figure 2:
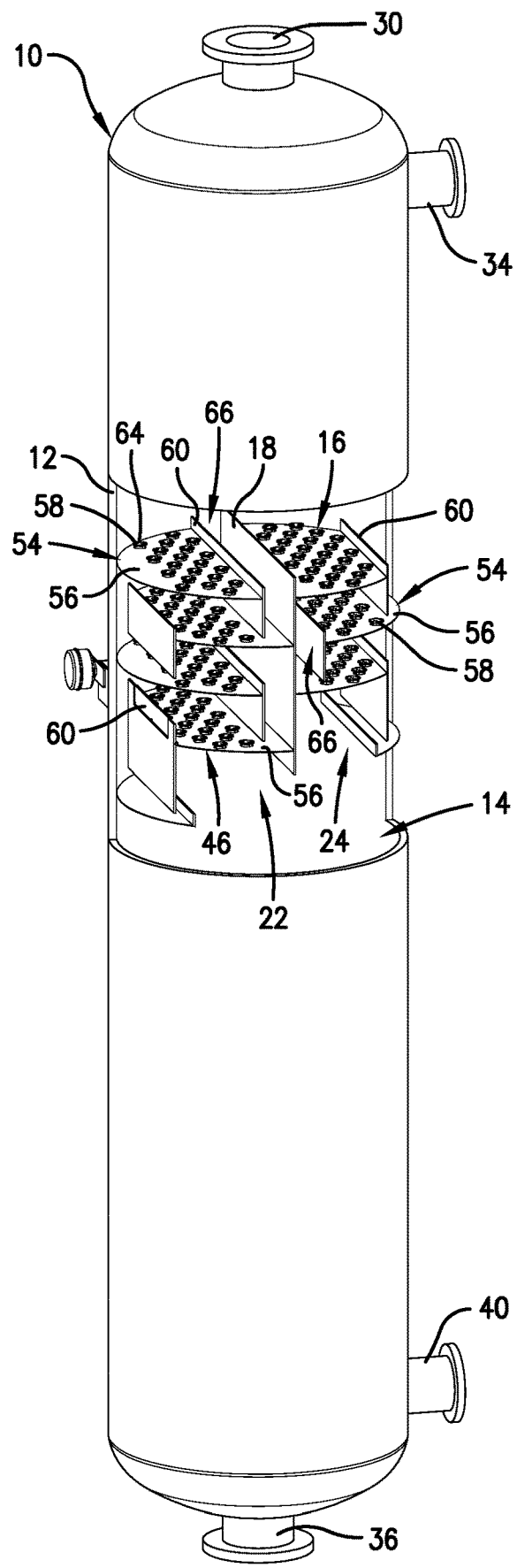
FIG. 2 is a side perspective view of the mass transfer column shown in FIG. 1a, with a portion of a shell of the mass transfer column broken away to show one embodiment of a mass transfer assembly that incorporates the dividing wall and a vapor flow restrictor.
Figure 3:
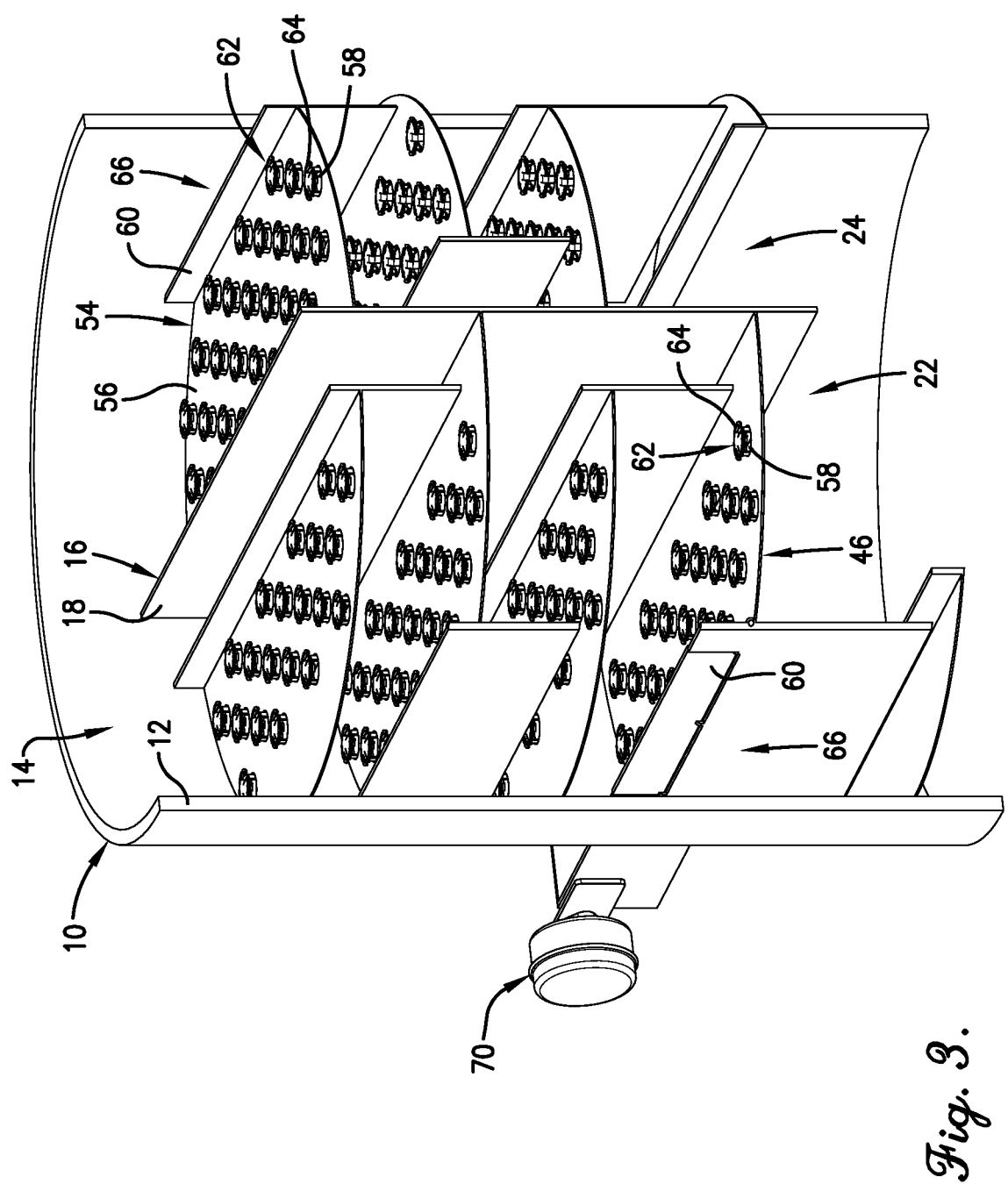
FIG. 3 is a fragmentary top perspective of the mass transfer column and the mass transfer assembly of FIG. 2, and shown on an enlarged scale from that used in FIG. 2.

In the embodiment of the mass transfer assembly 16 shown in FIG. 2, the zones 20 of mass transfer structures comprise cross-flow trays 54 that are positioned in the sub-regions 22 and 24 on both sides of the dividing wall 18. Turning additionally to FIGS. 3-6, each of the cross-flow trays 54 comprises a tray deck 56, vapor flow apertures 58 in the tray deck 56, and an outlet weir 60. Each of the vapor flow apertures 58 may be part of a valve 62 that comprises the vapor flow aperture 60 and a fixed or floating valve cover 64. The cross-flow trays 54 each include a downcomer 66 positioned at one end of the tray deck 56 to receive liquid as it overflows the outlet weir 60 and deliver it to a tray deck 56 on an underlying one of the cross-flow trays 54 where it flows across the tray deck 56 and enters another downcomer 66 after it overflows the outlet weir 60 on that tray deck 56. The cross-flow trays 54 are thus arranged in a single-pass arrangement with downcomers 66 positioned at opposite ends of successive cross-flow trays 54 so that liquid descends in a serpentine fashion through each of the zones 20. Multi-pass arrangements of the cross-flow trays 54 may also be used.

Figure 4:
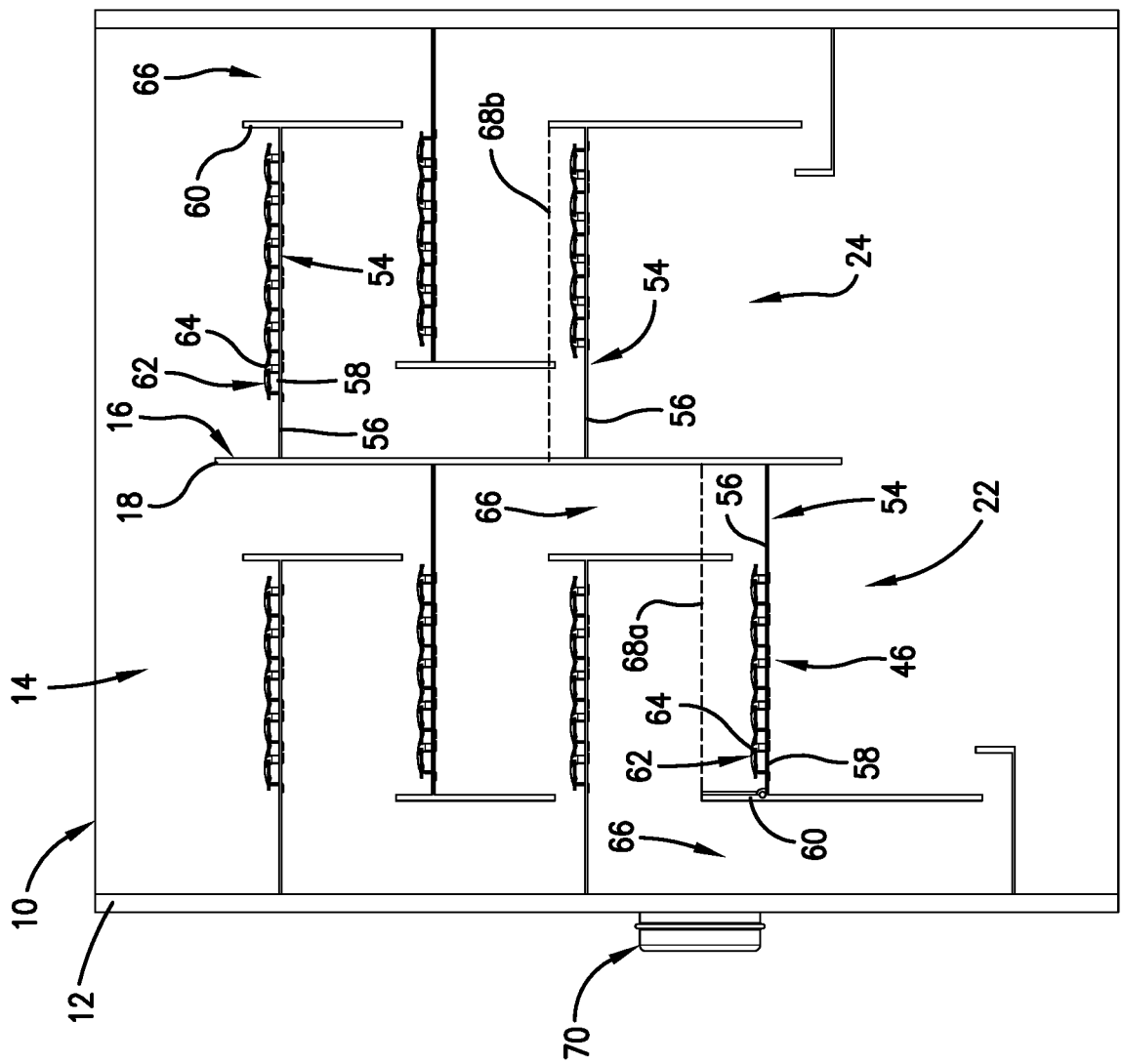
FIG. 4 is a side elevation view of the portion of the mass transfer column and the mass transfer assembly shown in FIG. 3.
Figure 5:
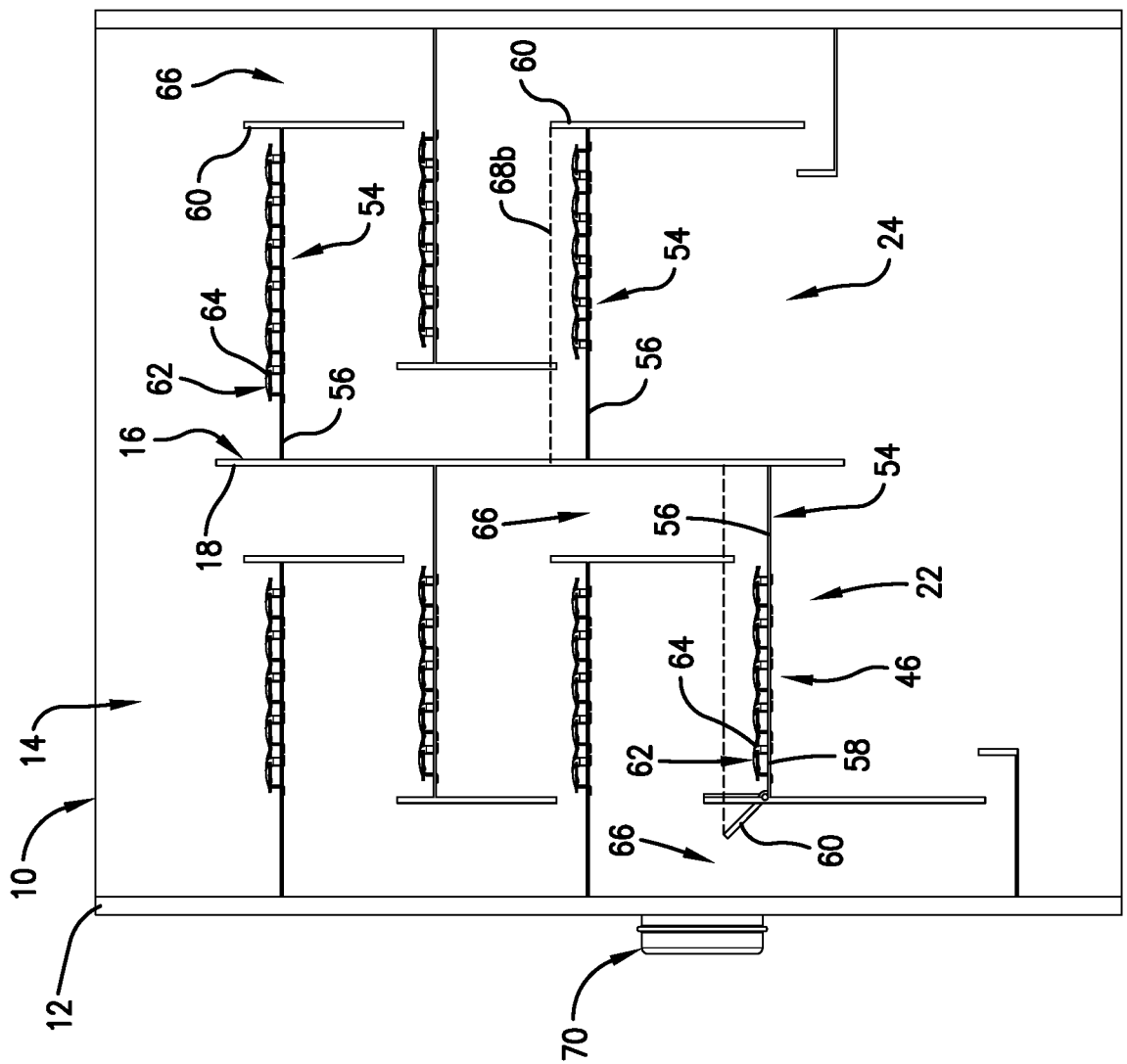
FIG. 5 is a fragmentary perspective view of the mass transfer assembly shown in FIG. 4, but with the vapor flow restrictor shown in a different orientation from that depicted in FIG. 4.

The vapor flow restrictor 46 in the mass transfer assembly 16 shown in FIGS. 2-6 comprises one or more of the cross-flow trays 54 in which the outlet weir 60 is moveable so that it extends to different heights above the tray deck 56. The cross-flow trays 54 with the moveable outlet weir 60 may otherwise be the same as, or they may be different in other ways from, the cross-flow trays with outlet weirs 60 that are fixed. When the cross-flow tray 54 is in a first orientation as shown in FIG. 5 the moveable outlet weir 60 extends to a first height above the tray deck 56 and when the cross-flow tray 54 is in a second orientation as shown in FIG. 4 the moveable outlet weir 60 extends to a second height above the tray deck 56 that is greater than the first height. By extending or decreasing the height of the moveable outlet weir 60, the depth that the liquid on the tray deck 56 must reach before it overflows the top of the moveable outlet weir 60 can be correspondingly increased or decreased. It can be seen that the liquid depths represented by the dotted lines 68a and 68b are generally the same when the moveable outlet weir 60 is at the first height shown in FIG. 5 and that the liquid depth represented by the dotted line 68a is greater than the liquid depth represented by the dotted line 68b when the moveable outlet weir 60 is at the second height shown in FIG. 4.

The liquid depth or liquid head on the tray deck 56 creates a wet pressure drop that acts to restrict the vapor flow as it ascends through the vapor flow apertures 58 in the tray deck 56 and then undergoes mass transfer and/or heat transfer with the liquid flowing across the tray deck 56. The adjustments in the height of the moveable outlet weir 60 thus acts to vary the restriction to vapor flow through the tray deck 56 and can be used to control the split of vapor flow through the sub-regions 22 and 24 on the opposite sides of the dividing wall 18. For example, when the liquid depth on the tray deck 56 of the cross-flow tray 54 with the moveable outlet weir 60 as represented by the dotted line 68a and the liquid depth on the tray deck 56 of one of the cross-flow trays 54 with a fixed outlet weir 60 on the opposite side of the dividing wall 18 as represented by the dotted line 68b are roughly the same, as shown in FIG. 5, the vapor split on the opposite sides of the dividing wall 18 may be roughly equal. When the liquid depth represented by the dotted line 68a is greater than that represented by the dotted line 68b, as shown in FIG. 4, the vapor split may become unequal and more volumetric flow of vapor will travel through the sub-region 24 on the draw-off side of the dividing wall 18. If more volumetric flow through the sub-region 22 is desired, the first height of the moveable weir 60 can be selected so that the liquid depth represented by the dotted line 68a on the cross-flow tray 54 in sub-region 22 is lower than that represented by the dotted line 68b on the cross-flow tray 54 in sub-region 24.

The vapor flow restrictor 46 shown in FIGS. 2-6 further comprises an actuator 70 associated with the moveable outlet weir 60 for moving it between the first and second heights. The actuator 70 can be of various types, such as a hydraulic actuator, a pneumatic actuator, an electric actuator, a magnetic actuator, and a thermal actuator. The actuator 70 may also include a manual override that allows the actuator 70 to be manually adjustable by an operator or it may be a mechanical actuator that is manually adjustable by the operator. In one embodiment, the moveable outlet weir 60 is pivotally mounted about a pivot axis 72 at the tray deck 56. The actuator 70 is operably coupled with the moveable outlet weir 60 to cause it to pivot between the first and second heights.

Figure 6:
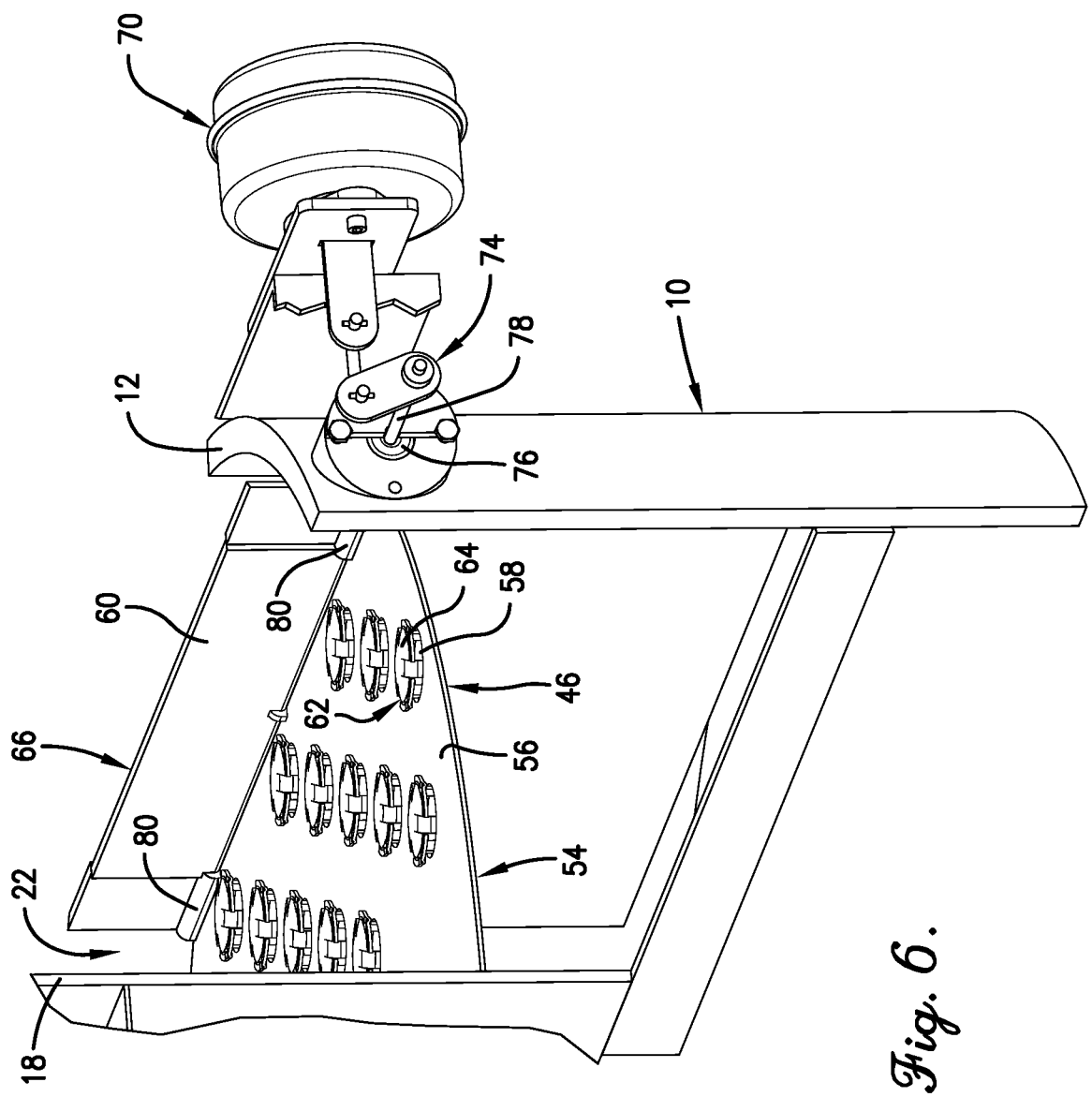
FIG. 6 is a fragmentary perspective view of the mass transfer assembly taken from an opposite side from that shown in FIG. 4, and shown on an enlarged scale from that used in FIG. 4.
Figure 7:
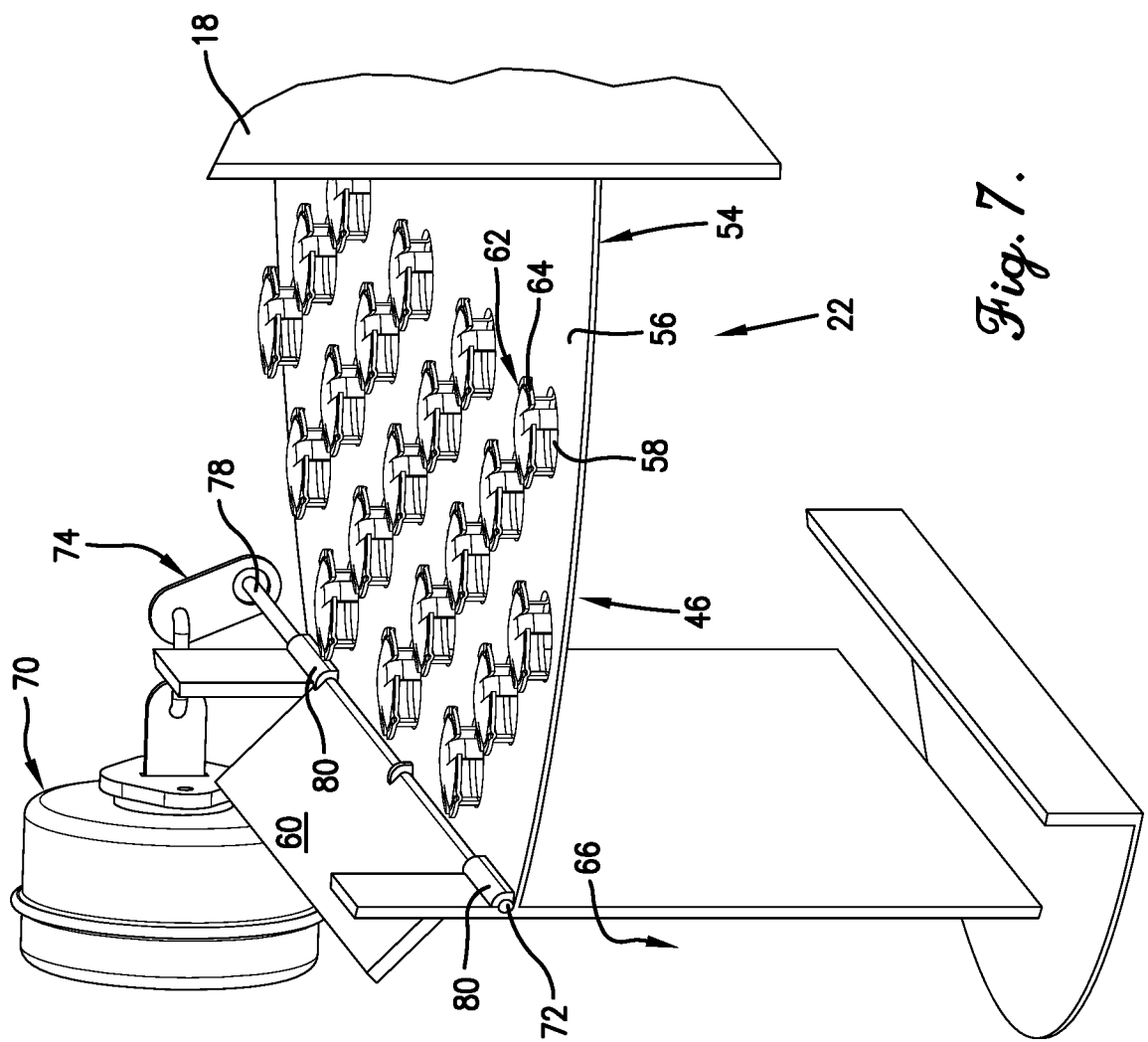
FIG. 7 is a fragmentary perspective view of the mass transfer assembly taken from an opposite side from that shown in FIG. 6 and showing the vapor flow restrictor in a different orientation from that shown in FIG. 6.

As best seen in FIGS. 6 and 7, the actuator 70 is connected by a linkage 74 that translates a linear movement from the actuator 70 to a rotational movement of the outlet weir 60 about its pivot axis 72. The actuator 70 is shown mounted exteriorly of the shell 12 of the mass transfer column 10 and the linkage 74 passes through a sealed opening 76 in the shell 12. In one embodiment, the linkage 74 includes a rod 78 that is fixed to the outlet weir 60. The rod 78 is rotatable within barrel segments 80 and serves as the pivot axis 72 about which the outlet weir 60 rotates.

When the outlet weir 60 is at its first height, it is rotated in the direction of the downcomer 66. Alternatively, it may be rotated toward the tray deck 56 when at its first height. When at its second height, the outlet weir 60 is rotated to an upright position. The outlet weir 60 need not rotate between its first and second heights. For example, it can be mounted so that it can be moved vertically between the first and second heights.

Figure 8:
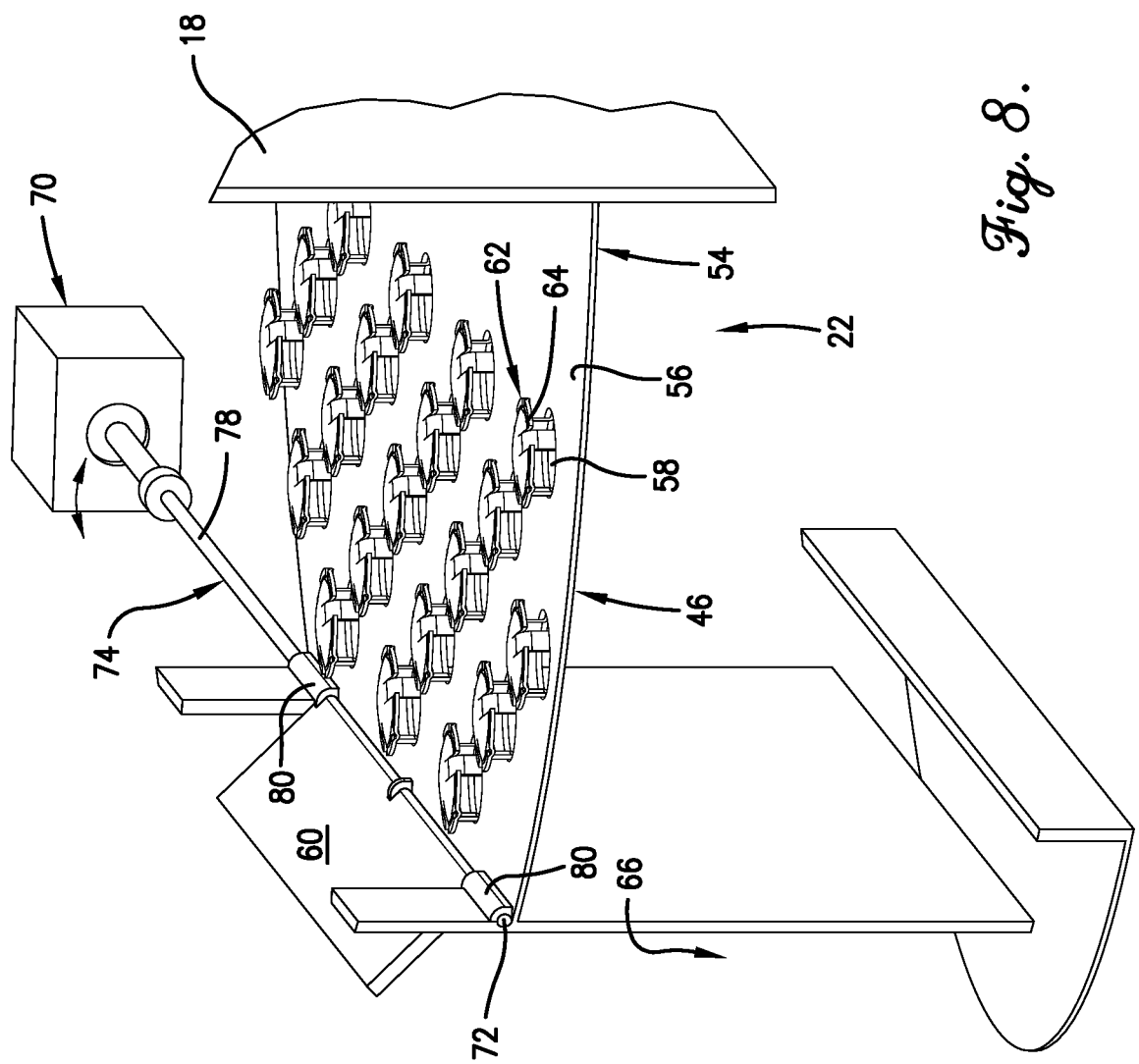
FIG. 8 is a fragmentary perspective view of the mass transfer assembly showing an alternate embodiment of the vapor flow restrictor.
Figure 9:
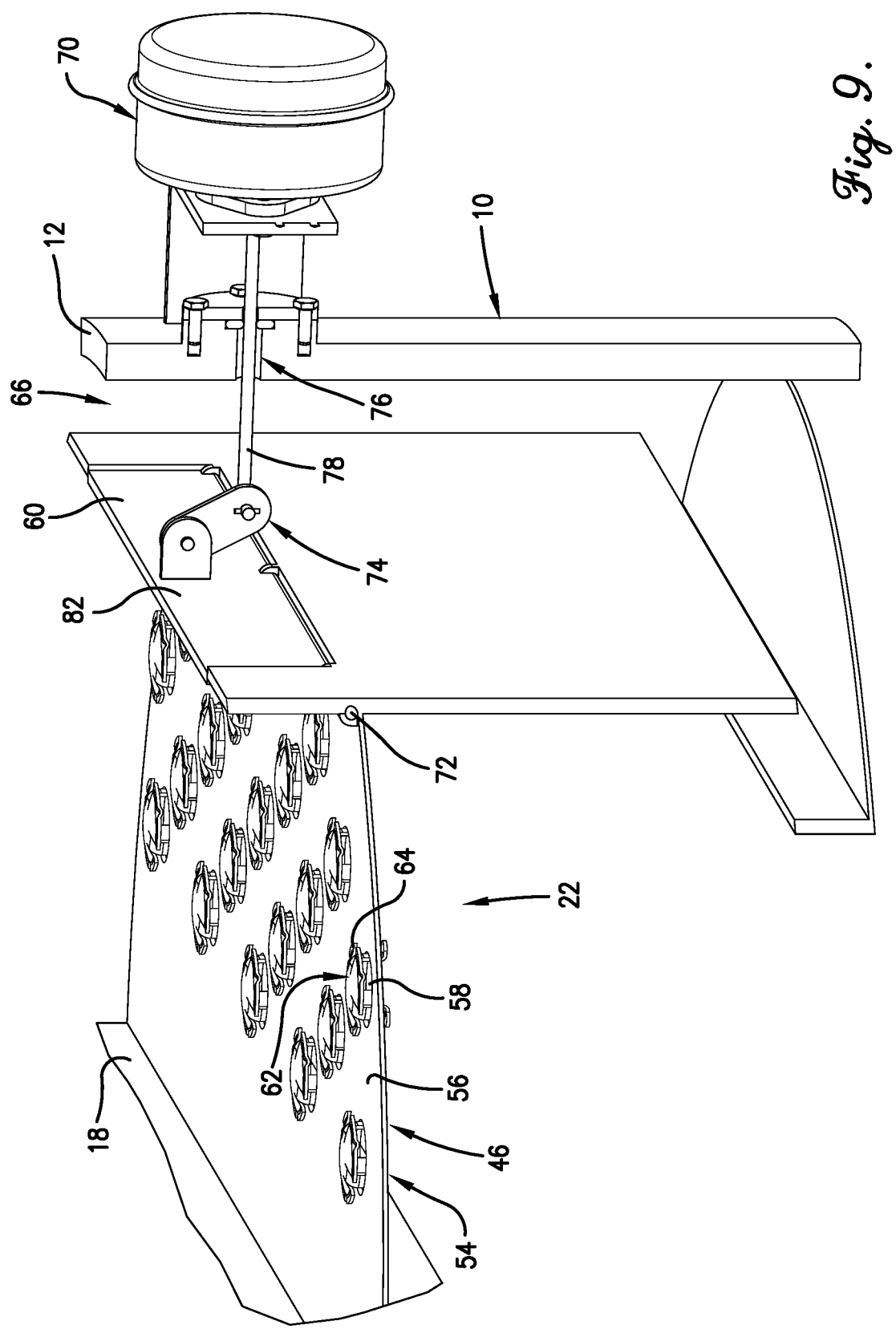
FIG. 9 is a fragmentary perspective view of the mass transfer assembly showing another embodiment of the vapor flow restrictor.
Figure 10:
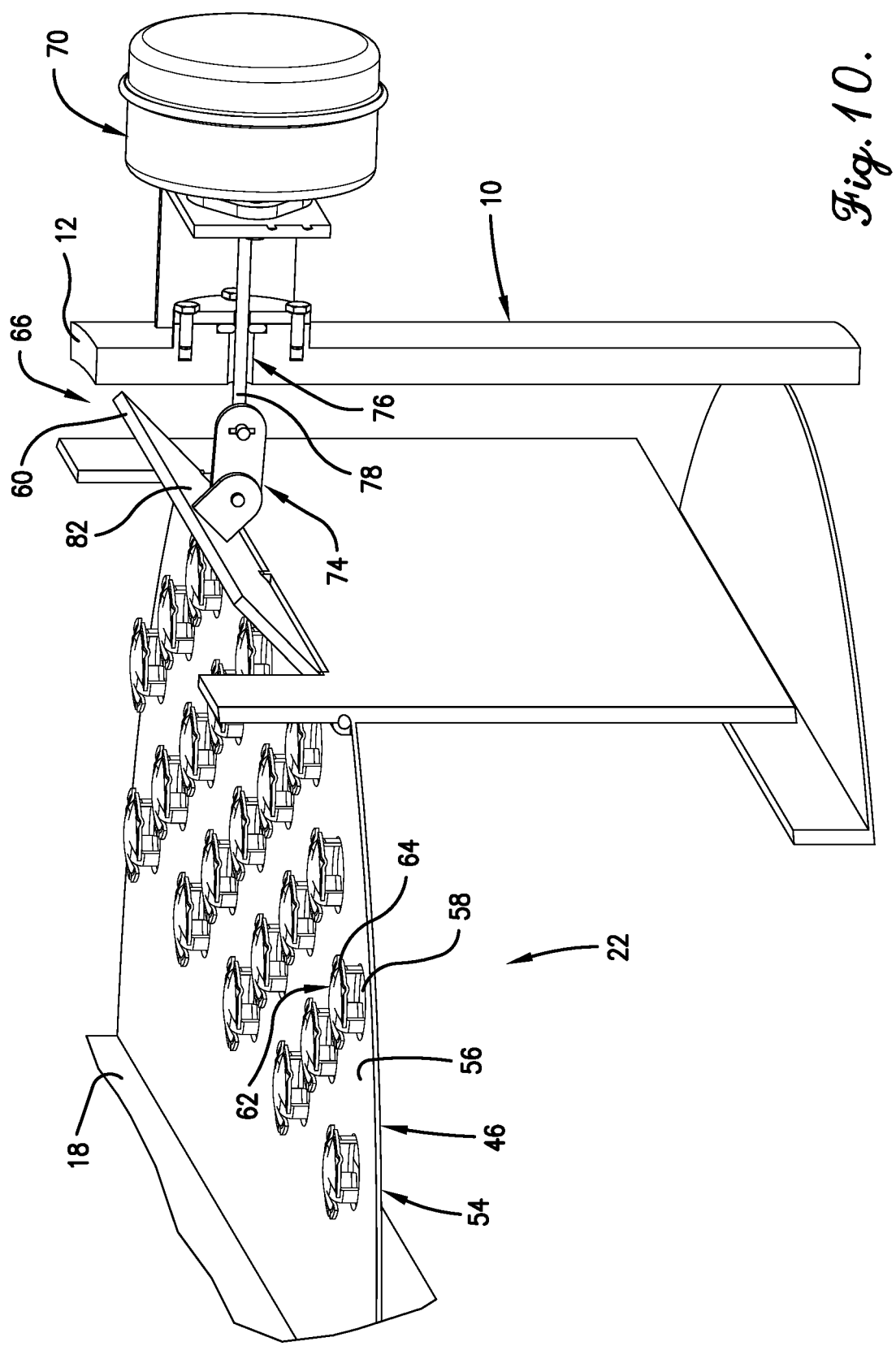
FIG. 10 is fragmentary bottom perspective view of the transfer assembly shown in FIG. 9, but with the vapor flow restrictor in a different orientation from that shown in FIG. 9.

The movement and resulting height adjustment of the outlet weir 60 can be achieved in various ways. In the embodiment shown in FIG. 8, the actuator 70 is a rotary actuator that directly rotates the rod 78 fixed to the outlet weir 60 without the need for the other linkage 74 components shown in FIGS. 6 and 7 that translate a linear motion of the actuator 70 to the rotary motion. In the embodiment shown in FIGS. 9 and 10, the linkage 74 is directly connected to an outer face 82 of the outlet weir 60 and the actuator 70 is a linear actuator that causes rotation of the outlet weir 60 without the need for the linkage 74 components that translate linear motion to rotary motion. Alternatively, the linkage 74 may comprise a magnetic coupling of the rod 78 or another component of the linkage 74 to the actuator 70. As one example of a suitable magnetic coupling, a drive magnet is attached to and is driven by a shaft of the actuator 70 from a location that is outside of the shell 12. One end of the rod 78 or other component of the linkage 74 is attached to another magnet located within the shell 12 and is rotated by rotation of the drive magnet. This magnetic coupling eliminates the need for the sealed opening 76 in the shell 12.

Another embodiment of a vapor flow restrictor 146 that is operable to vary a total open area of the vapor flow apertures 158 is shown in FIGS. 11-18, in which the same numbers preceded by the prefix "1" are used for like components described in connection with FIGS. 2-10. The vapor flow restrictor 146 comprises one or more of the cross-flow trays 154 on one or both of the sides of the dividing wall 118. In a first orientation of this embodiment of the vapor flow restrictor 146, a total open area of the vapor flow apertures 158 in the tray deck 156 is less than the total open area of the vapor flow apertures 158 in that tray deck 156 when the vapor flow restrictor 146 is in the second orientation. The vapor flow apertures 158 are shown as part of fixed valves 162 having valve covers 164.

The adjustments in the total open area of the vapor flow apertures 158 in the tray deck 156 of one or more of the cross-flow trays 154 thus acts to vary the restriction to vapor flow through the tray deck 156 and can be used to control the split of vapor flow through the sub-regions 122 and 124 on the opposite sides of the dividing wall 118. For example, when the total open area of the vapor flow apertures 158 in the vapor flow restrictor 146 in sub-region 122 is less than the total open area of the vapor flow apertures 158 in each of the cross-flow trays 154 on the opposite side of the dividing wall 188 in sub-region 124, the vapor split on the opposite sides of the dividing wall 18 may be unequal and a greater volumetric flow of vapor will ascend through the sub-region 124. If more volumetric flow through the sub-region 122 is desired, total open area of the vapor flow apertures 158 in the vapor flow restrictor 146 in sub-region 122 is increased by movement of a restrictor plate 84 so it is greater than the total open area of the vapor flow apertures 158 in each of the cross flow trays 154 on the opposite side of the dividing wall 188 in sub-region 124. In other embodiments, the vapor split can be controlled by movement of restrictor plates 84 in vapor flow restrictors 146 positioned on opposite sides of the dividing wall 118 in sub-regions 122 and 124.

Figure 11:
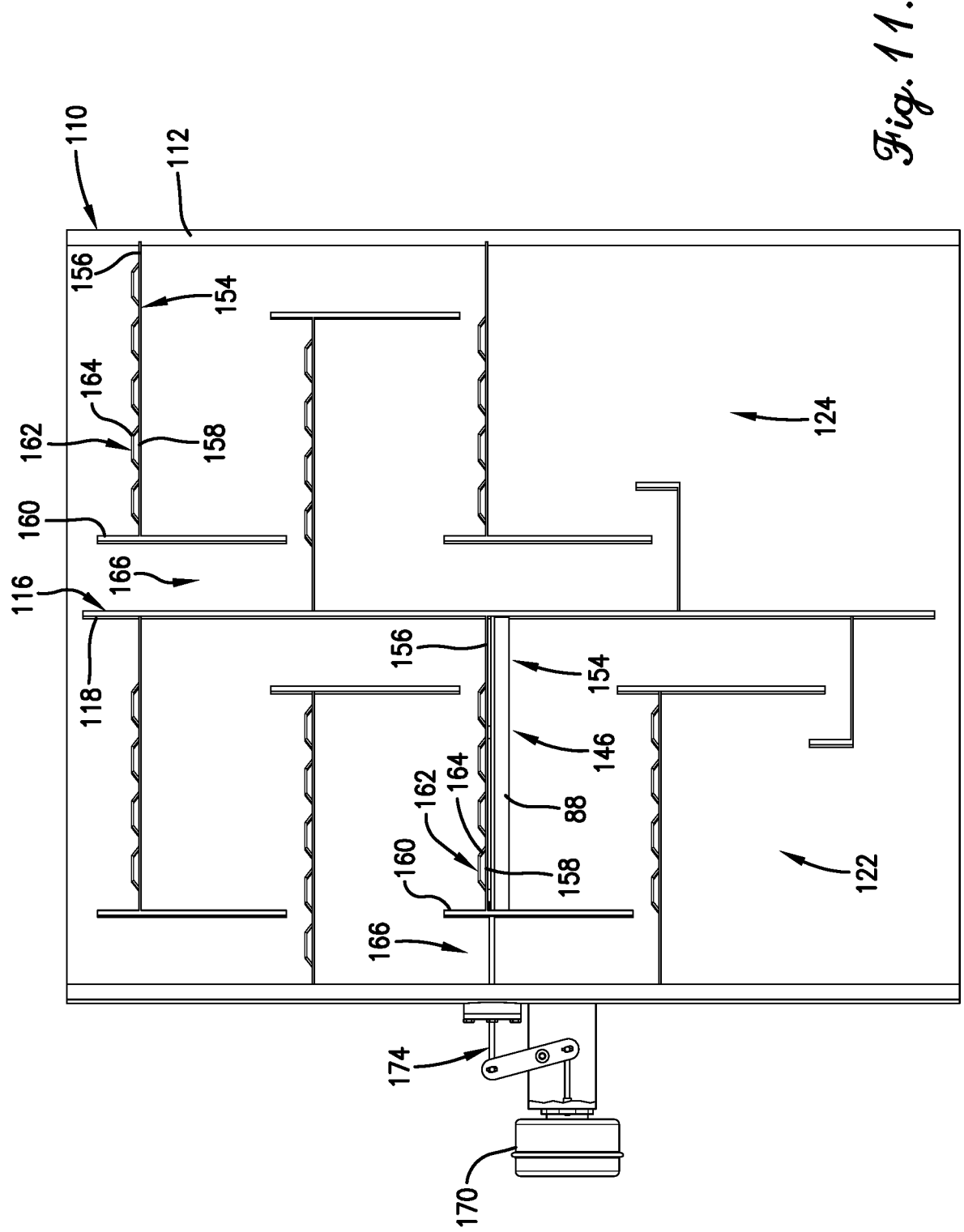
FIG. 11 is a fragmentary side elevation view of the mass transfer column showing an alternate embodiment of the mass transfer assembly.
Figure 12:
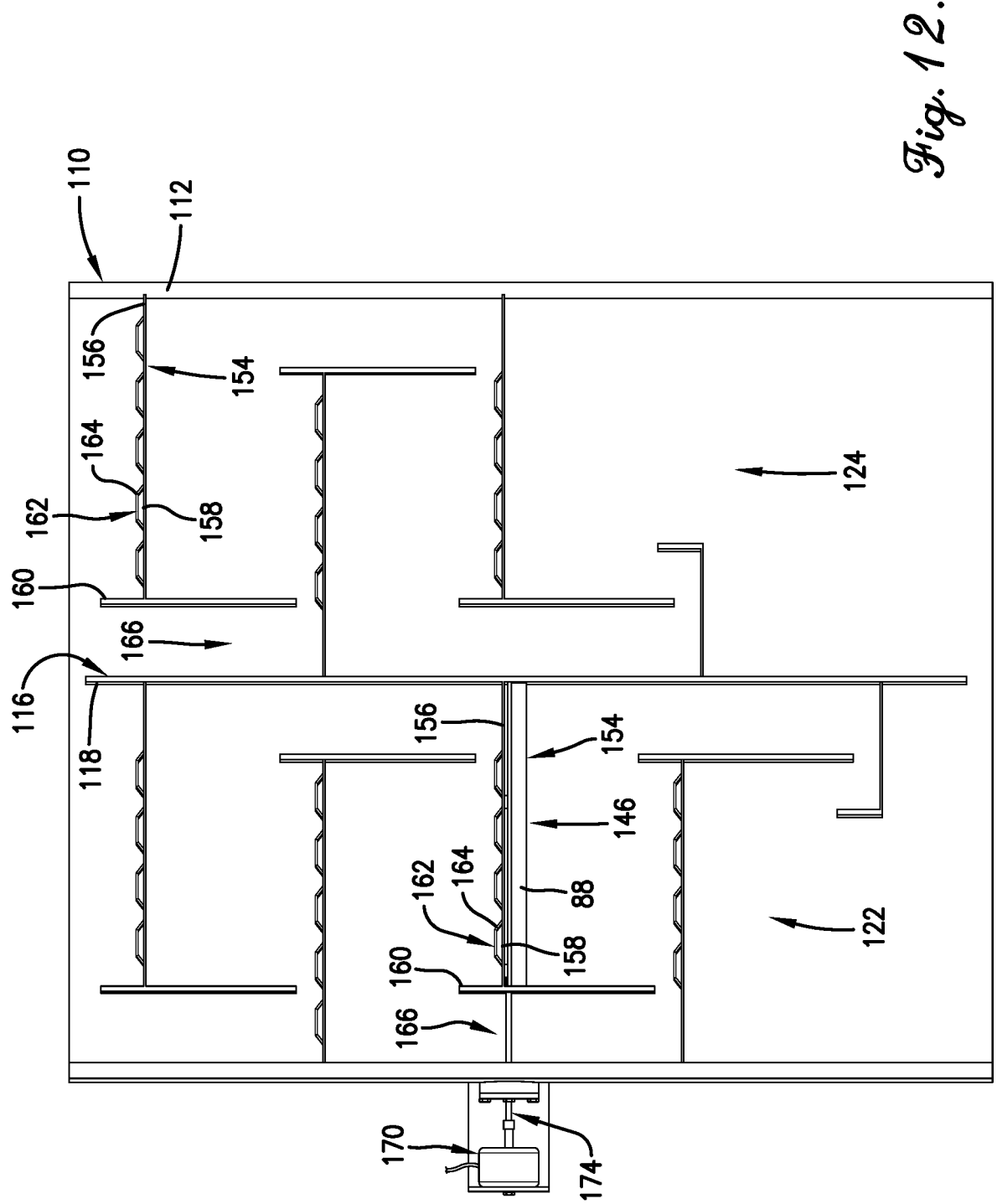
FIG. 12 is a fragmentary side elevation view of the mass transfer column and mass transfer assembly of FIG. 11, but showing an alternate embodiment of the vapor flow restrictor.
Figure 13:
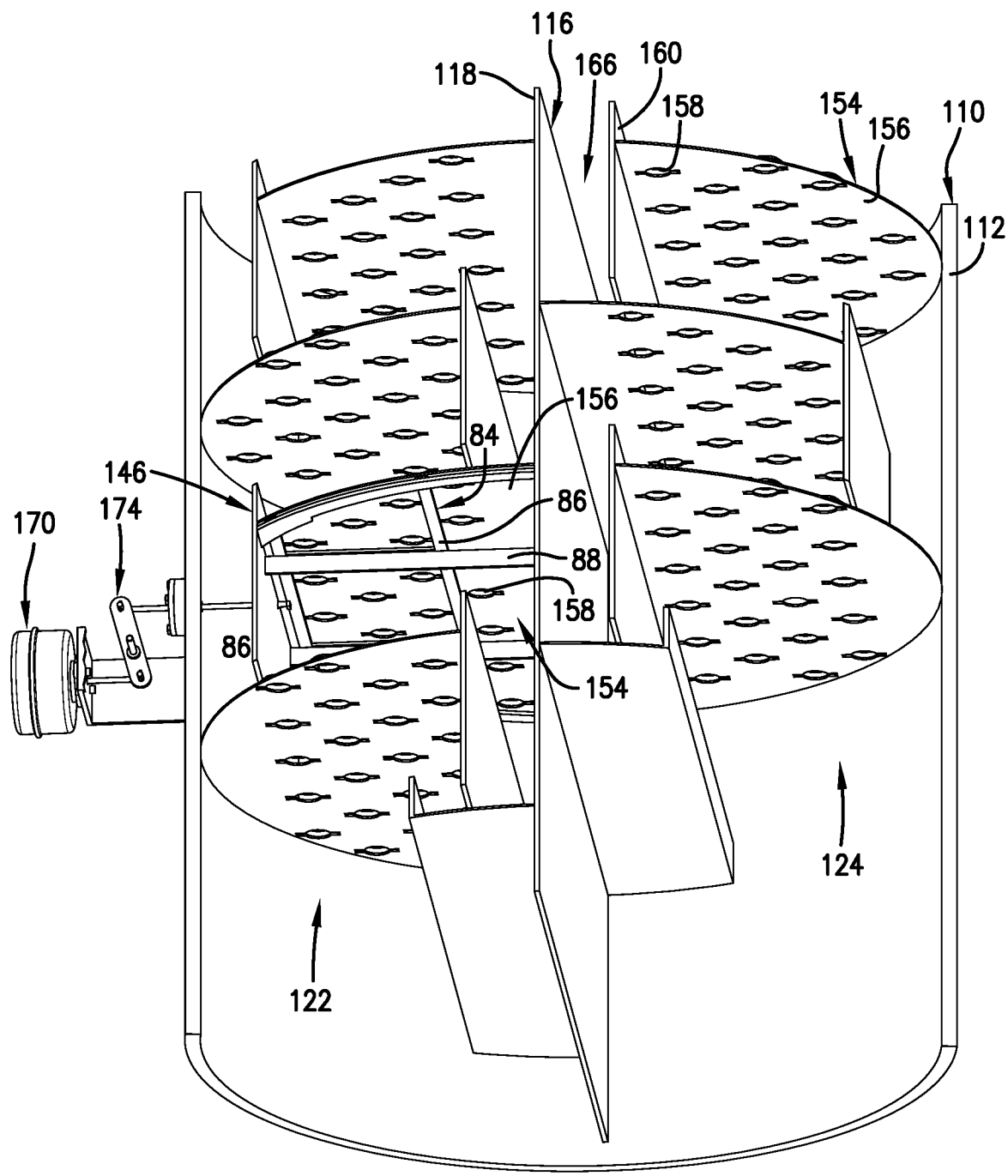
FIG. 13 is a fragmentary bottom perspective view of the mass transfer column and mass transfer assembly shown in FIG. 11.

The vapor flow restrictor 146 also comprises an actuator 170 that may be mounted exteriorly on the shell 12 and is operably associated with the restrictor plate 84 to control movement of the restrictor plate 84. The restrictor plate 84 may be mounted beneath the tray deck 156 of the cross-flow tray 154 that forms part of the vapor flow restrictor 146. The actuator 170 may be coupled with the restrictor plate 84 by a linkage 174 that transmits the linear motion of the actuator 170 to the restrictor plate 84, as shown in FIG. 12. As one alternative, the linkage 174 may be arranged to increase the linear motion of the actuator 170 as it is transmitted to the restrictor plate 84, as shown in FIG. 11.

Figure 14:
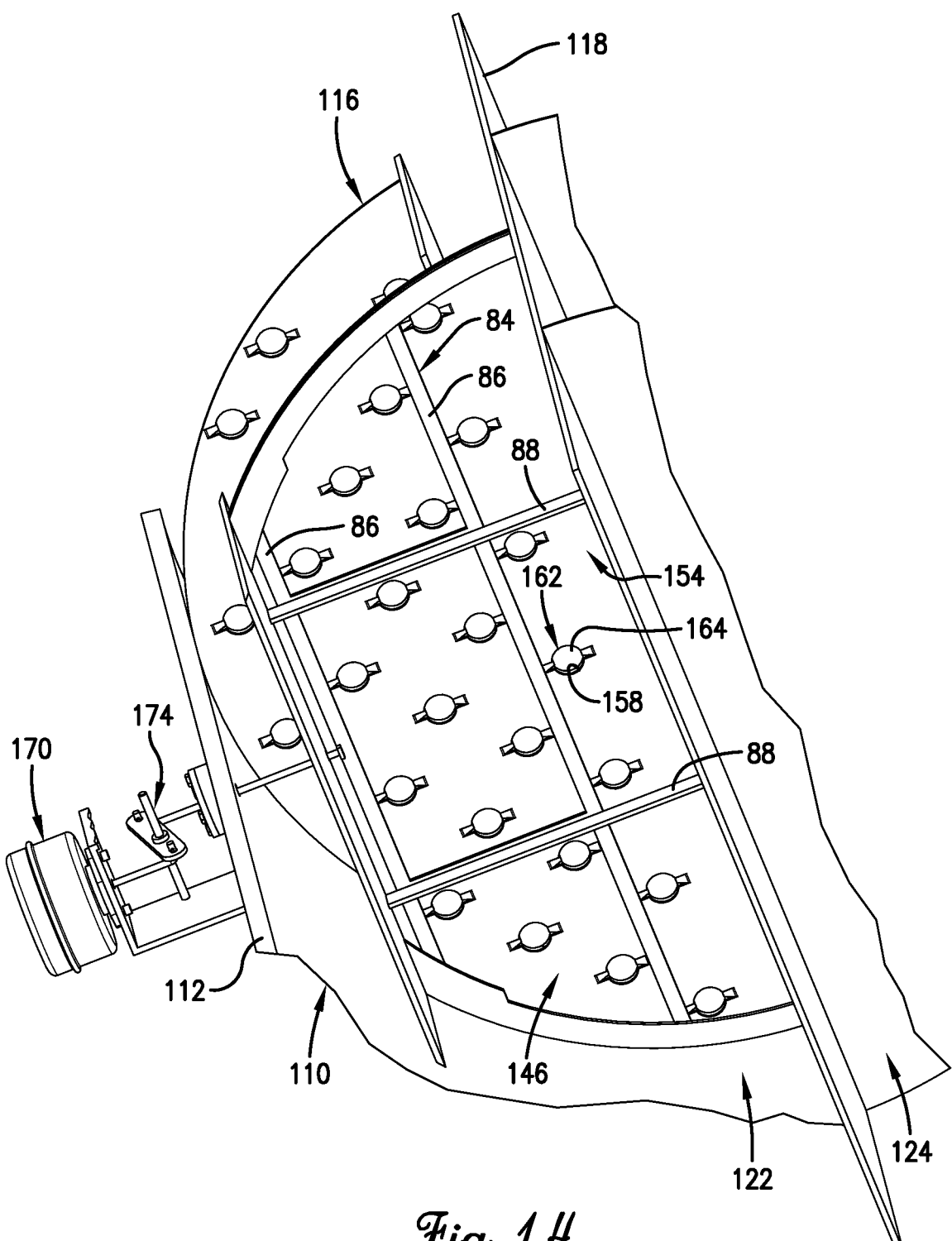
FIG. 14 is an enlarged fragmentary bottom perspective view of the mass transfer column and mass transfer assembly shown in FIG. 13.
Figure 15:
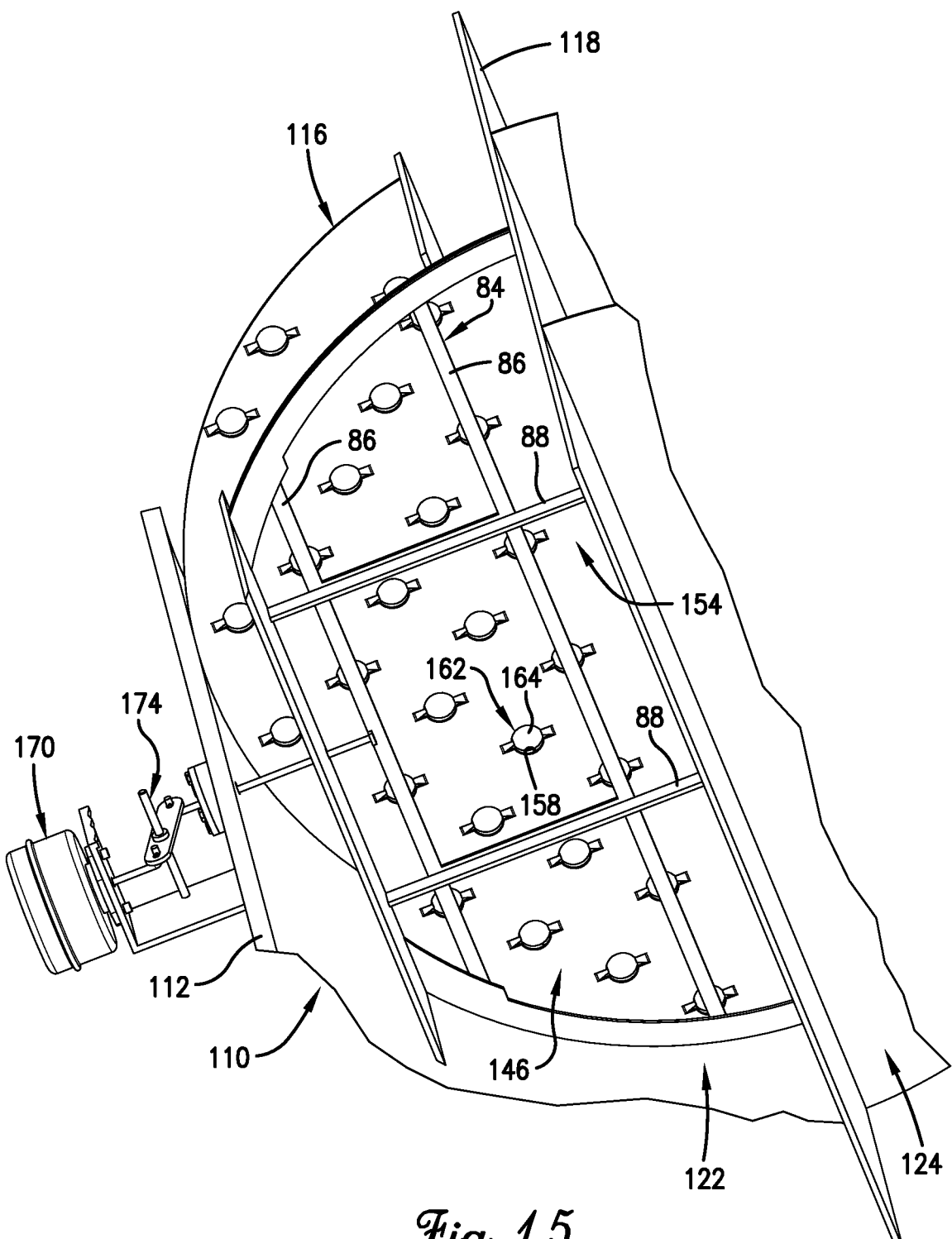
FIG. 15 is a fragmentary bottom perspective view of the mass transfer column and mass transfer assembly similar to that shown in FIG. 13, but with the vapor flow restrictor repositioned to a different orientation from that shown in FIG. 13.
Figure 16:
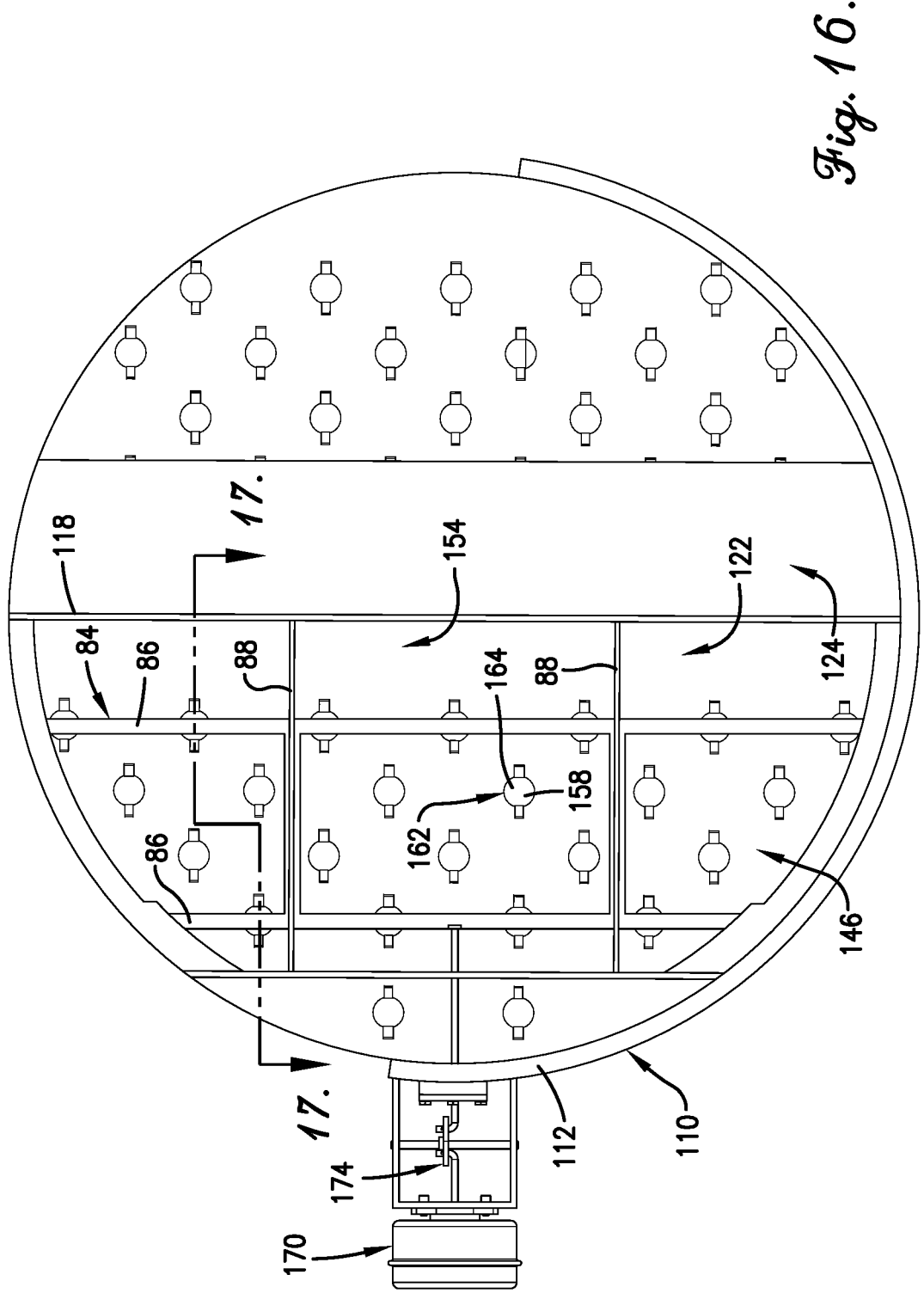
FIG. 16 is a fragmentary bottom plan view of the mass transfer column and mass transfer assembly shown in FIG. 15.

As can best be seen in FIGS. 13-18, the restrictor plate 84 comprises one or more segments 86 that rest on and slide along support guides 88. The segments 86 of the restrictor plate 84 may be brought into alignment with some or all of the vapor flow apertures 158 as shown in FIGS. 15-17 and may be removed from such alignment as shown in FIGS. 14 and 18. When the vapor flow restrictor 146 is in the first orientation, the segments 86 are moved into an alignment with some or all of the vapor flow restrictors 158 such that the total open area of the vapor flow apertures 158 in the tray deck 156 of the vapor flow restrictor 146 is less than the total open area of the vapor flow apertures 158 in tray decks 156 of the cross-flow trays 154 on the opposite side of the dividing wall 118. This may then result in a greater volumetric flow of vapor through the sub-region 124 than through the sub-region 122 where the vapor flow restrictor 146 is positioned. When the vapor flow restrictor 146 is in the second orientation, the segments 86 are repositioned such that the total open area of the vapor flow apertures 158 in the tray deck 156 of the vapor flow restrictor 146 is greater than the total open area of the vapor flow apertures 158 in tray decks 156 of the cross-flow trays 154 on the opposite side of the dividing wall 118. This may then result in a greater volumetric flow of vapor through the sub-region 122 where the vapor flow restrictor 146 is positioned than through the sub-region 124.

Figure 19:
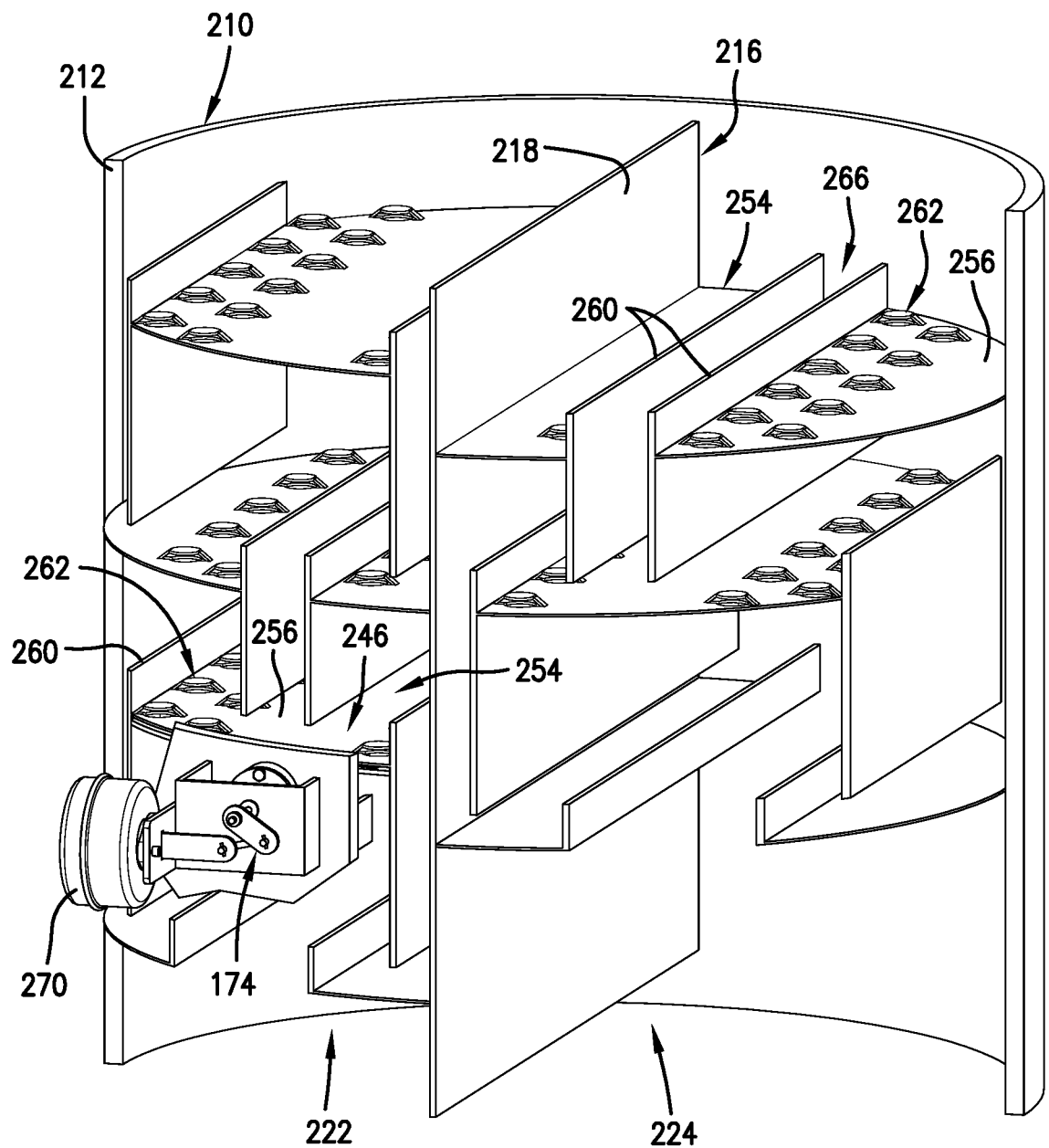
FIG. 19 is a fragmentary side elevation view of the mass transfer column showing a further embodiment of the mass transfer assembly and vapor flow restrictor.
Figure 20:
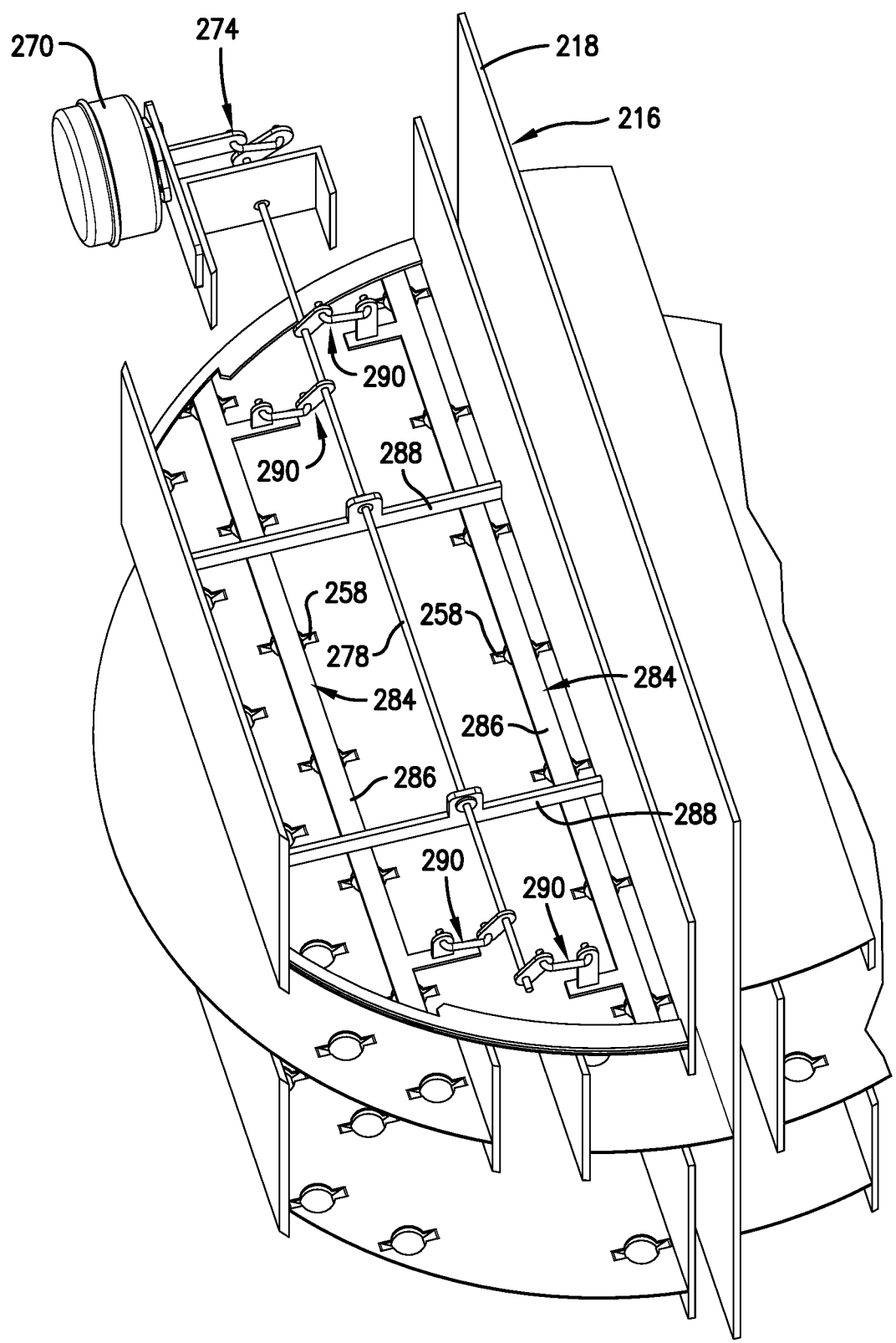
FIG. 20 is a fragmentary bottom perspective view of the mass transfer assembly shown in FIG. 19.
Figure 21:
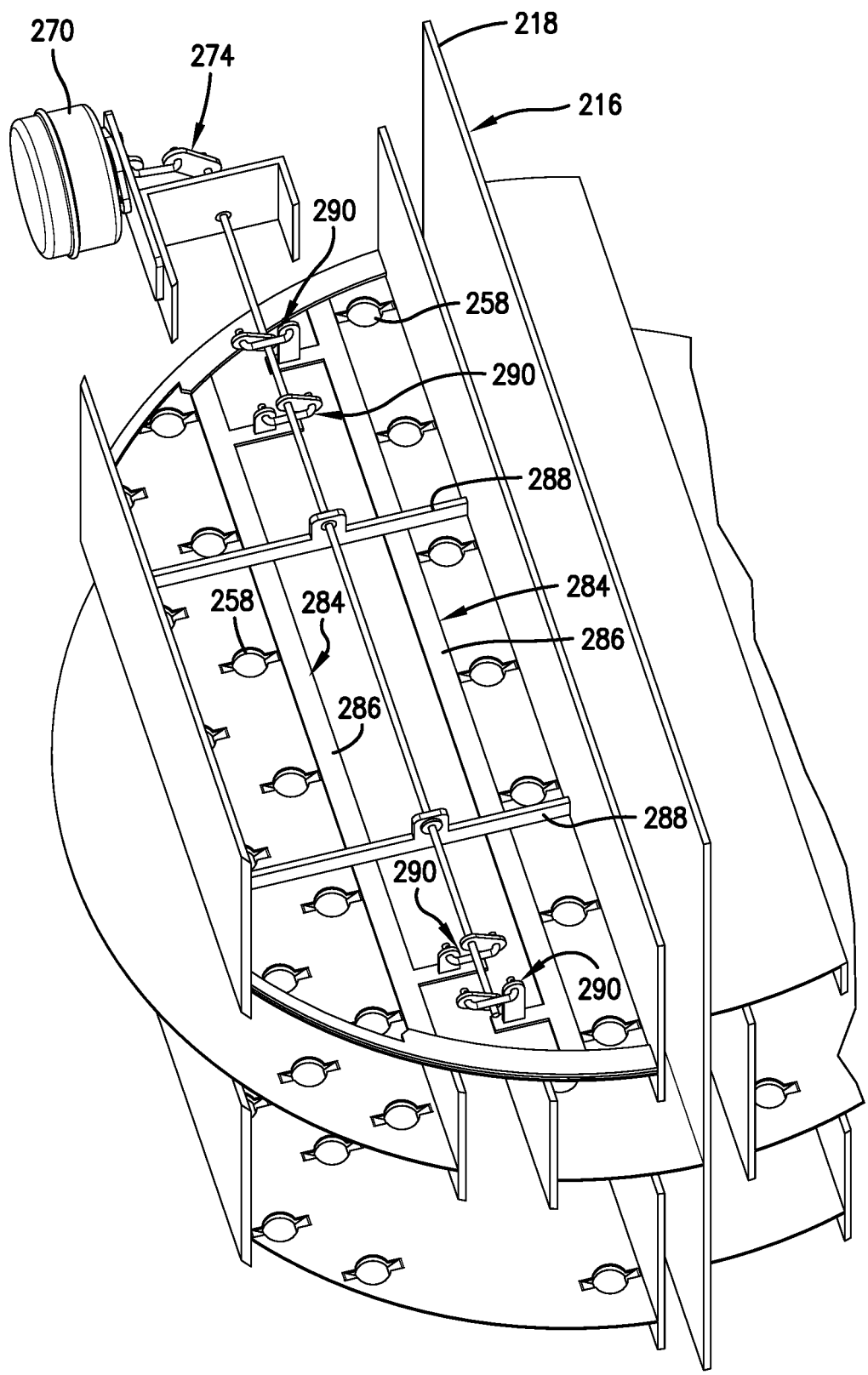
FIG. 21 is a fragmentary bottom perspective view of the mass transfer assembly similar to the view shown in FIG. 20, but with the vapor flow restrictor repositioned to a different orientation from that shown in FIG. 20.

While the cross-flow trays 154 are shown in FIGS. 11-18 in a single-pass arrangement, they may alternatively be constructed in a multi-pass arrangement, such as the two-pass arrangement shown in FIGS. 19-21 in which the prefix "2" is used for the similar numbered components. In the vapor flow restrictor 246, the actuator 270 is connected by the linkage 274 to two of the restrictor plates 284 positioned under the tray deck 256. The linkage 274 is arranged so that linear extension of the actuator 270 causes rotational movement of the rod 278. The rod 278 is connected by separate links 290 to the two restrictor plates 284 so that rotation of the rod 278 causes the restrictor plates 284 to move into and out of alignment with some or all of the vapor flow apertures 258. This allows the vapor split through the sub-regions 222 and 224 to be varied in the manner previously described.

Figure 22:
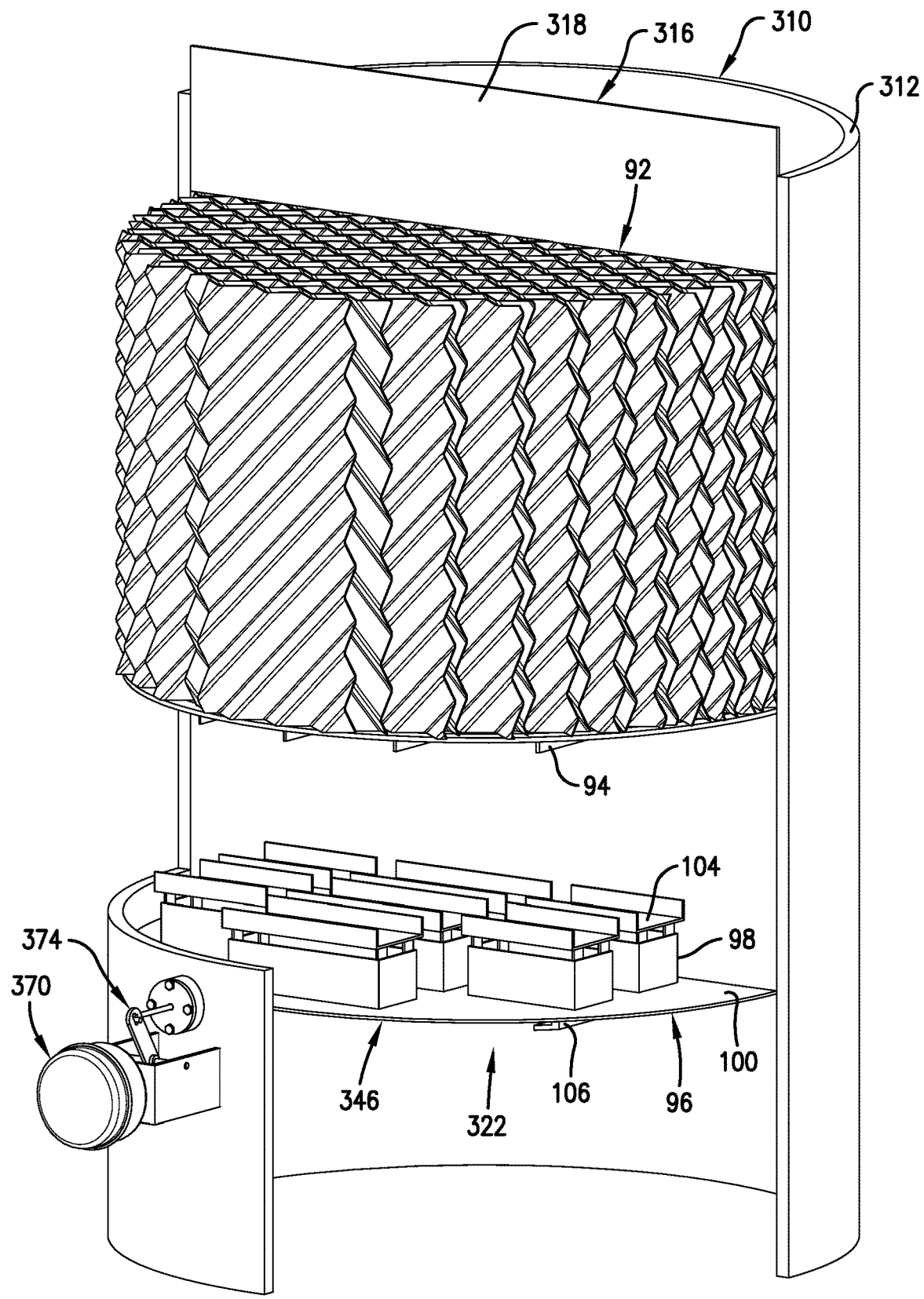
FIG. 22 is a fragmentary side perspective view of the mass transfer column with a still further embodiment of the mass transfer assembly and vapor flow restrictor.
Figure 23:
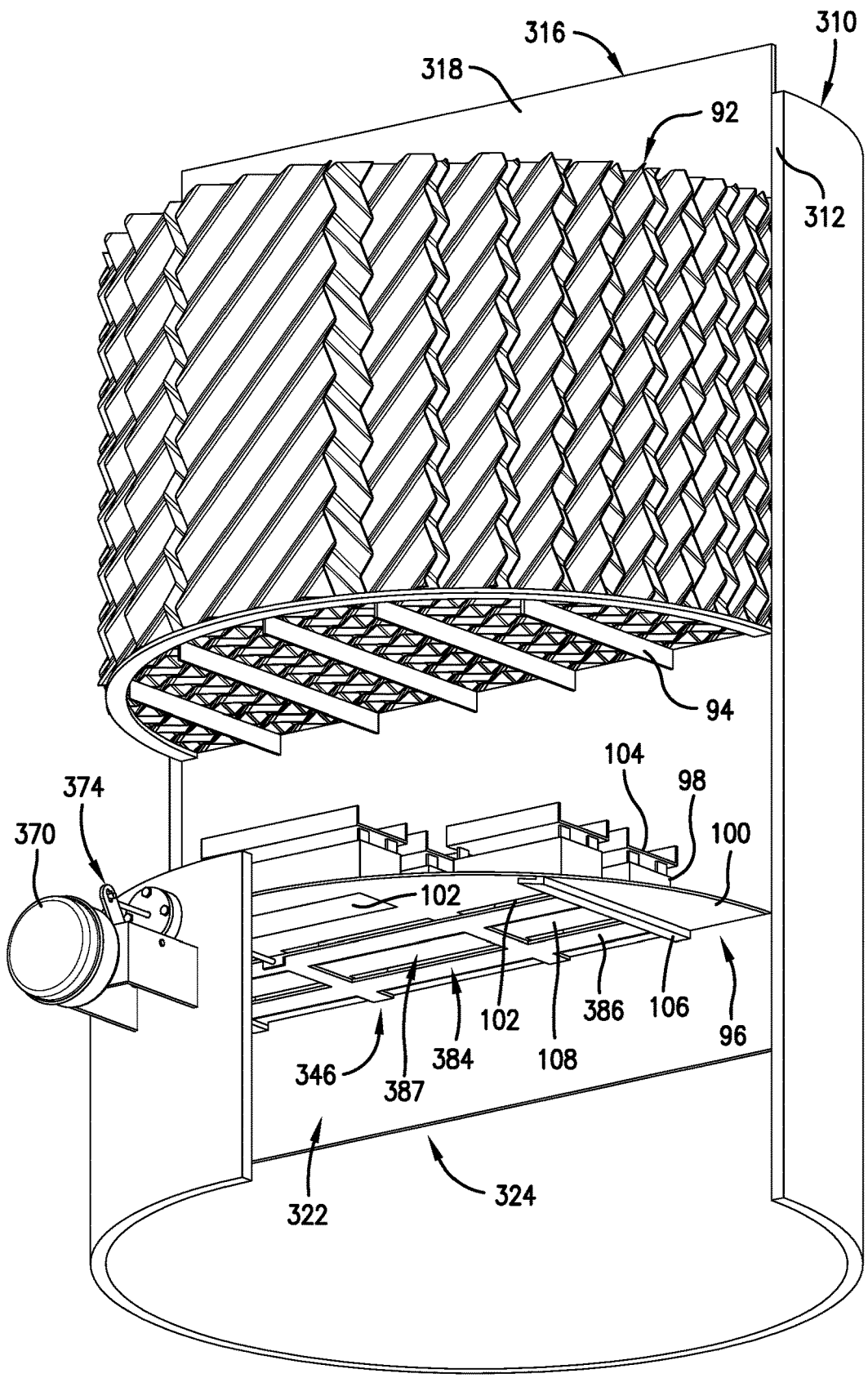
FIG. 23 is a fragmentary bottom perspective view of the mass transfer column and mass transfer assembly shown in FIG. 22.
Figure 24:
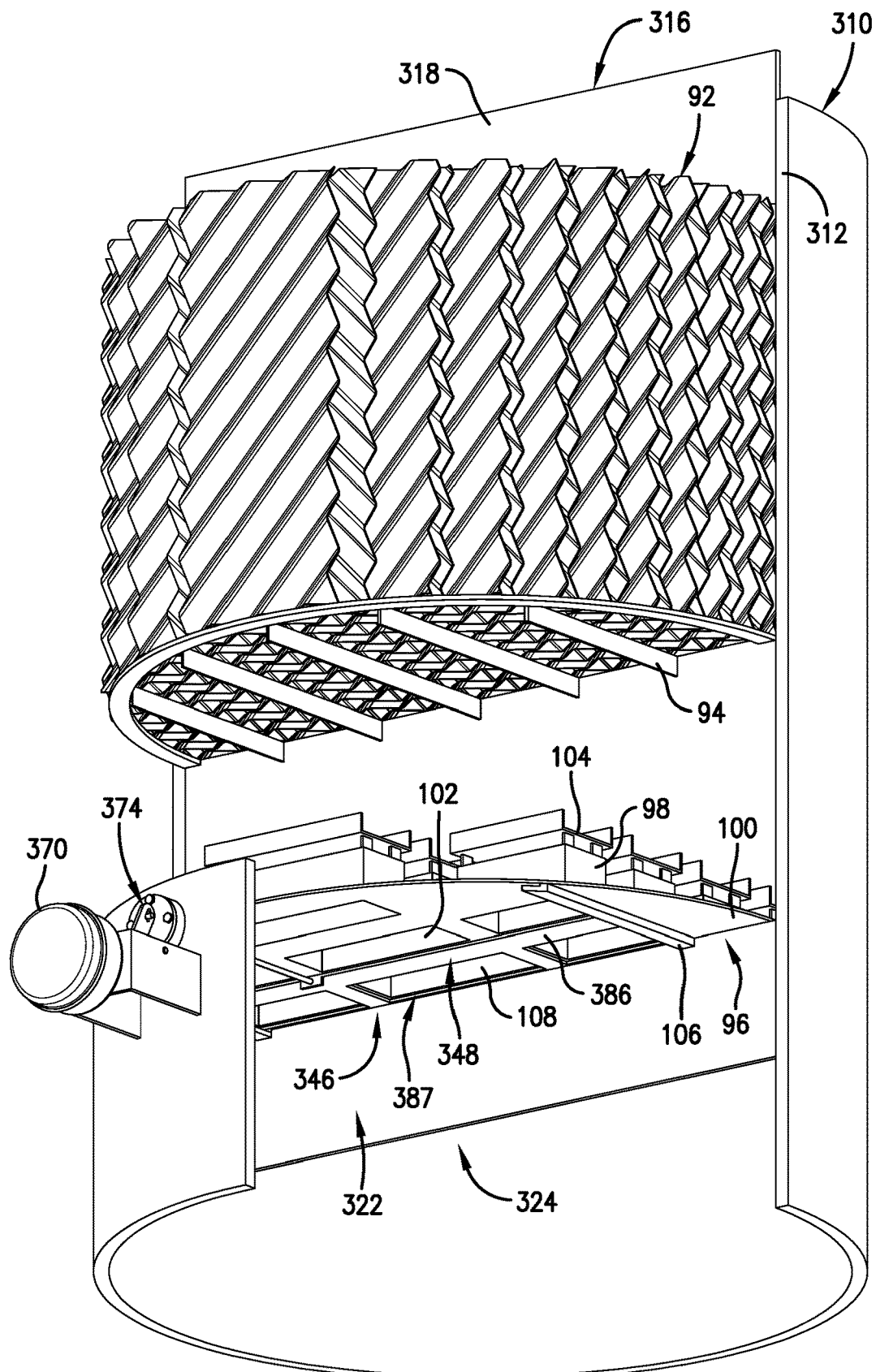
FIG. 24 is a fragmentary bottom perspective view of the mass transfer column and mass transfer assembly shown in FIG. 23, but with the vapor flow restrictor repositioned to a different orientation from that shown in FIG. 23.

In the embodiment shown in FIGS. 22-24, the mass transfer assembly is designated by the numeral 316 and illustrates the use of the invention with structured packing 92 as the mass transfer structures 20. The prefix "3" is used for the similar numbered components in this embodiment. The corrugated sheets of structured packing 92 are supported on a grid support 94 that is spaced above the vapor flow restrictor 346. Random packing or grid packing may be used in place of the structured packing 92.

The vapor flow restrictor 346 comprises a chimney tray 96 having risers 98 that extend upwardly from a tray deck 100 and surround vapor flow apertures 102 in the tray deck 100. The risers 98 in the illustrated embodiment have a rectangular cross-section and are covered by caps 104. The vapor flow restrictor 346 includes a restrictor plate 384 mounted beneath the tray deck 100 and an actuator 370 this is coupled with the restrictor plate 384 by a linkage 374. The restrictor plate 384 slides within guides 106 and is constructed so that segments 386 are moved into and out of alignment with one or more of all of the vapor flow apertures 102 by the sliding movement of the restrictor plate 384 to vary the total open area of the vapor flow apertures 102 in a manner similar to that described with respect to restrictor plate 84. The vapor split through the sub-regions 322 and 324 may be controlled in this manner.

The segments 386 in the restrictor plate 384 that are used to vary the total open area of the vapor flow apertures 102 in the tray deck 100 may be of various sizes and shapes. In one embodiment, the segments 386 are constructed to form and surround openings 108 in the restrictor plate 384 that are of the same or similar size and shape as the vapor flow apertures 102 in the tray deck 100. The openings 108 are positioned in the restrictor plate 384 at locations such that the sliding movement of the restrictor plate 384 brings the openings 108 into and out of alignment with some or all of the vapor flow apertures 102.

Figure 25:
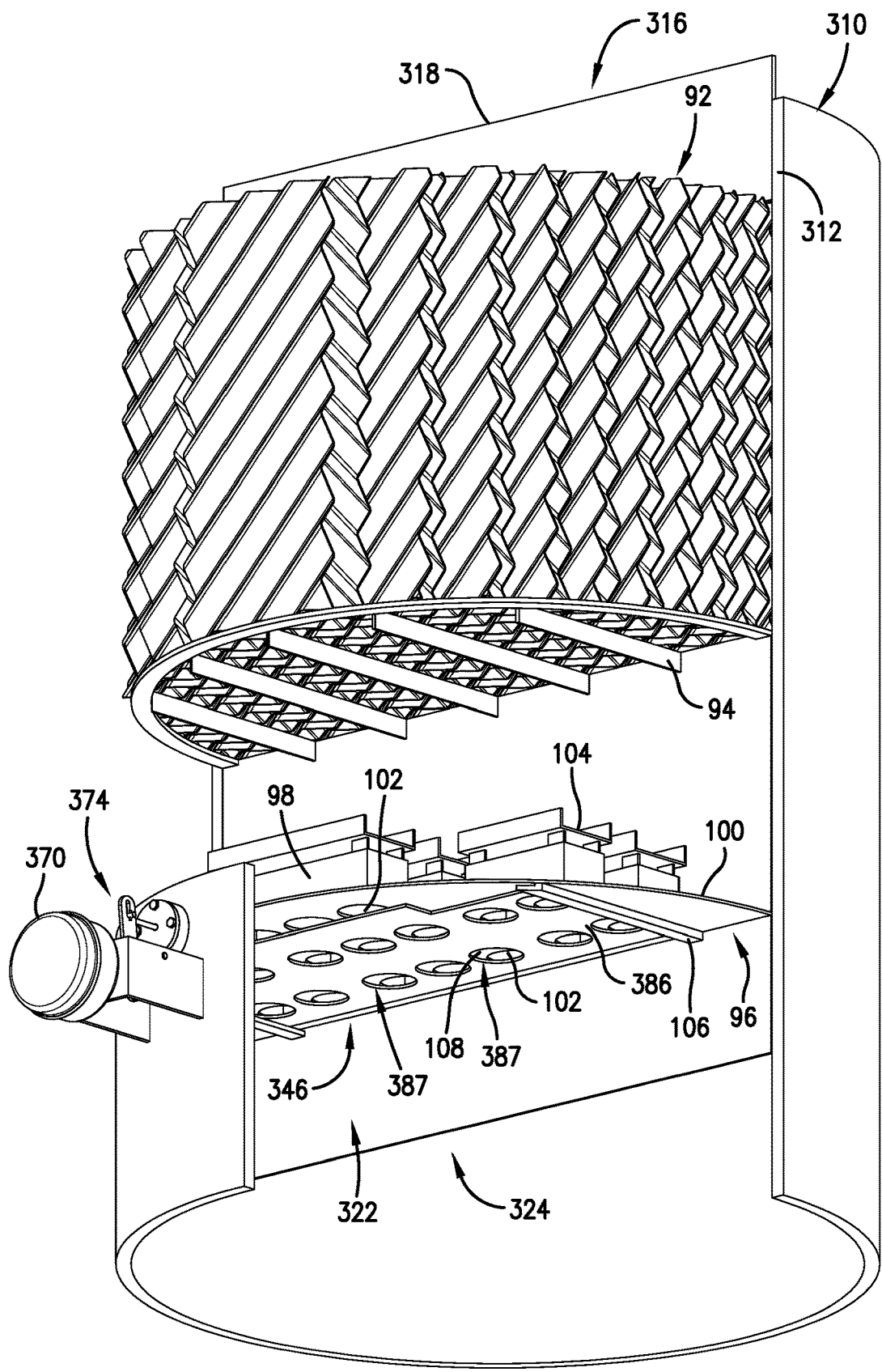
FIG. 25 is a fragmental bottom perspective view of the mass transfer column and mass transfer assembly of FIGS. 22-24, but with circular vapor flow apertures in the tray deck and circular openings in the restrictor plate.
Figure 26:
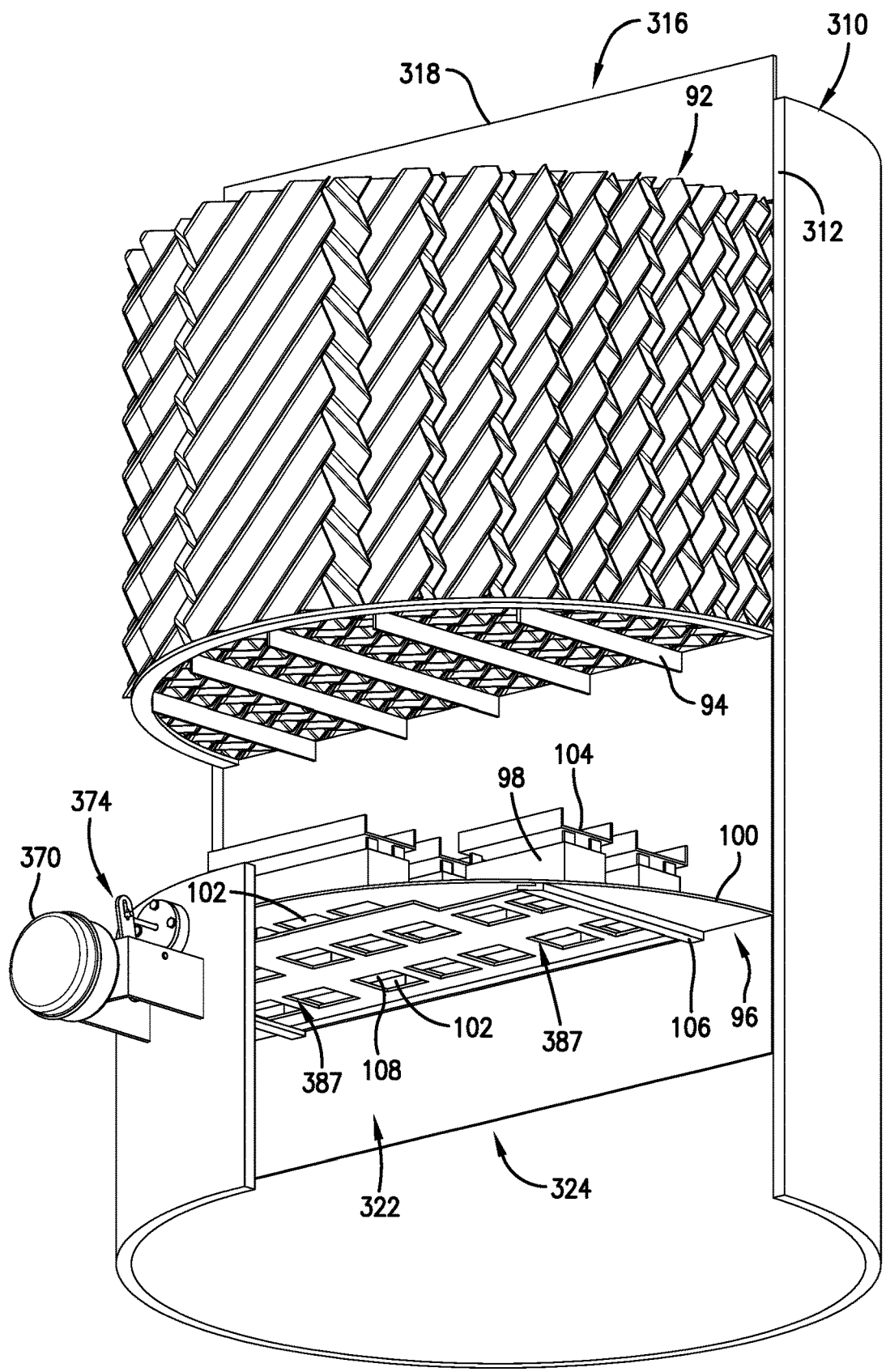
FIG. 26 is a fragmental bottom perspective view of the mass transfer column and mass transfer assembly of FIGS. 22-24, but with square vapor flow apertures in the tray deck and square openings in the restrictor plate.
Figure 27:
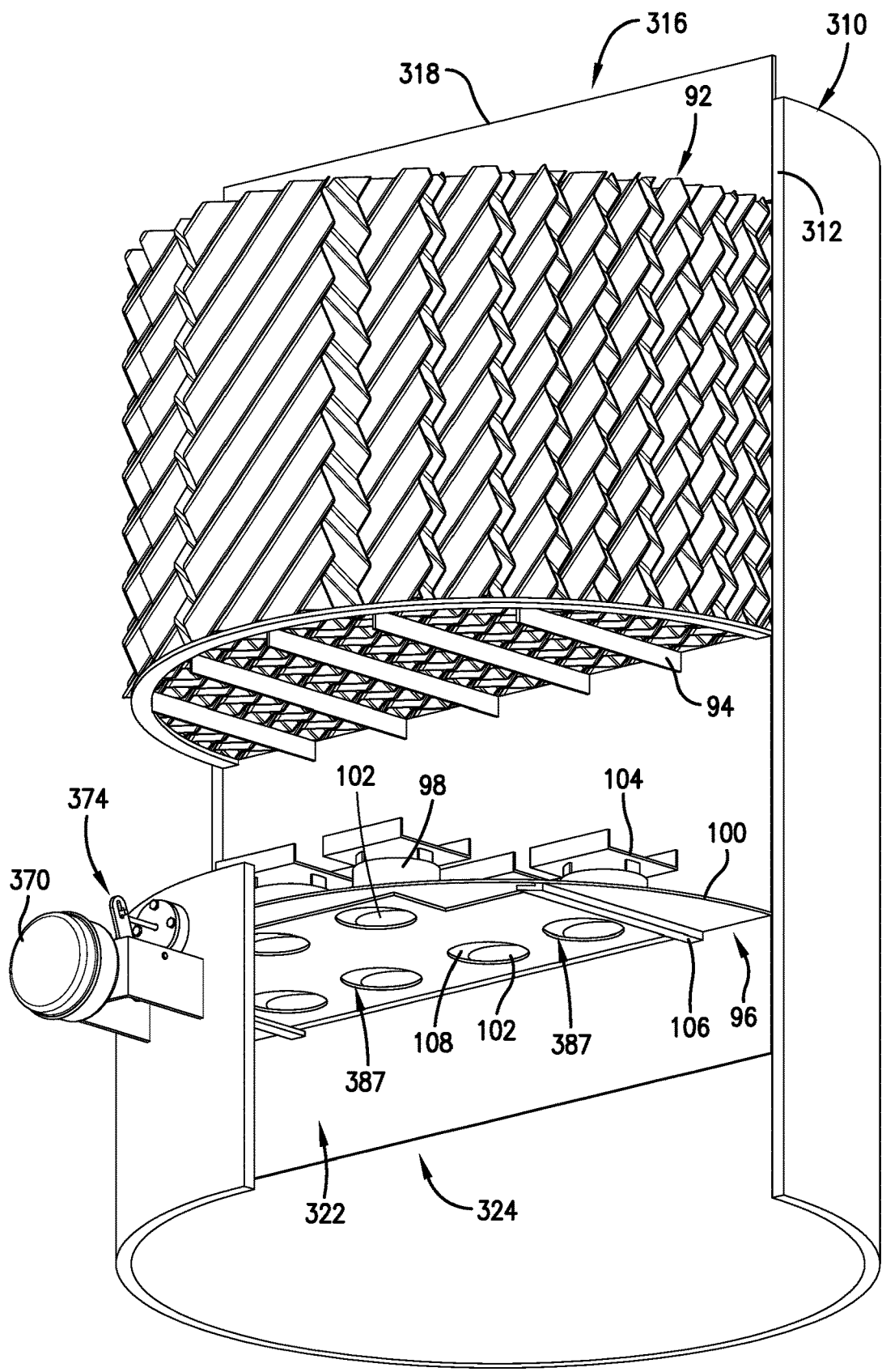
FIG. 27 is a fragmental bottom perspective view of the mass transfer column and mass transfer assembly of FIGS. 22-24, but having risers on the tray deck with a circular cross section, circular vapor flow apertures in the tray deck, and circular openings in the restrictor plate.
Figure 28:
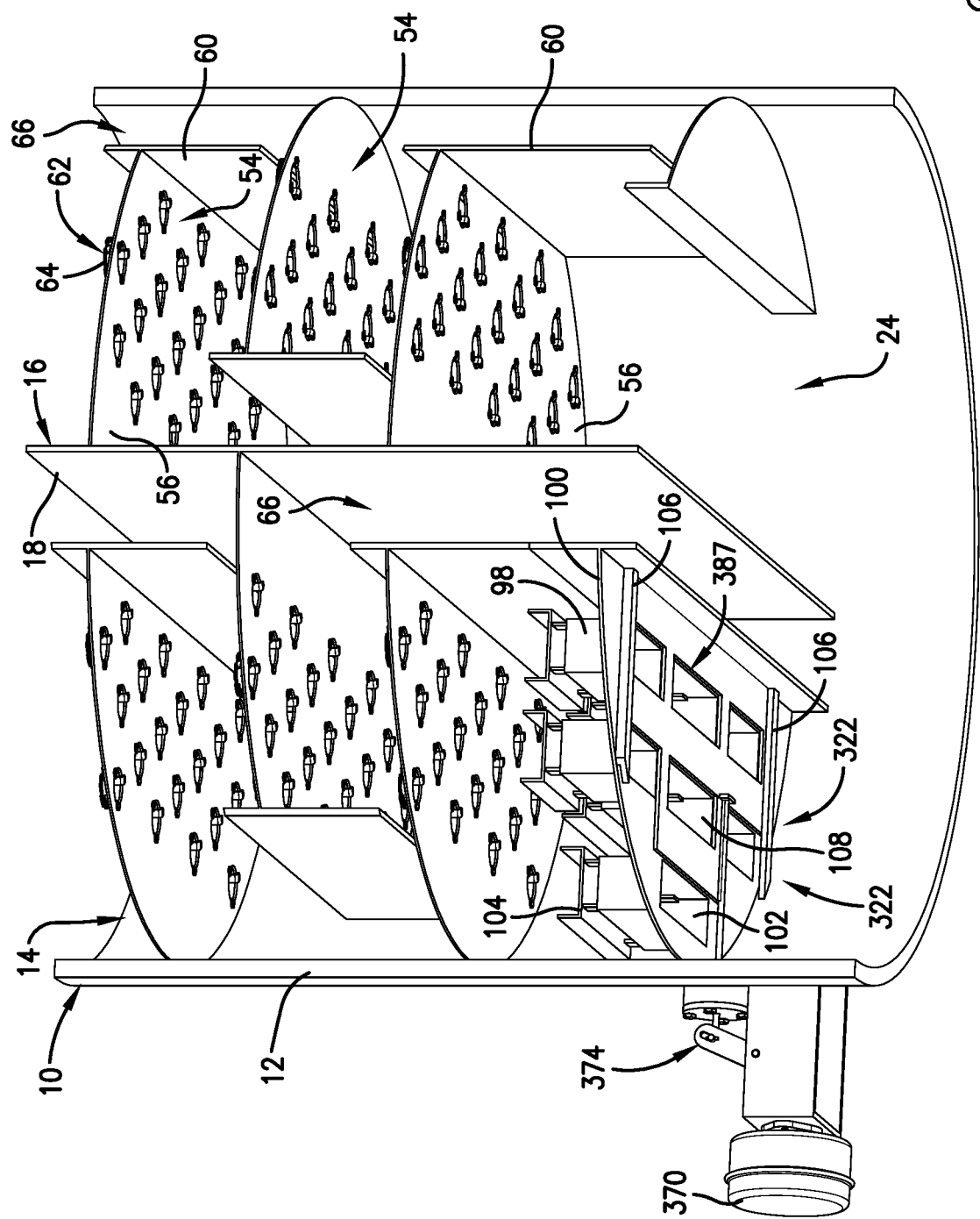
FIG. 28 is a bottom perspective of a portion of a mass transfer column and a mass transfer assembly similar to that shown in FIG. 3, but using a vapor flow restrictor of the type shown in FIGS. 22-24.

The chimney tray 96 may be constructed as shown in FIGS. 22-24 and FIG. 27 so that each riser 98 surrounds one of the vapor flow apertures 102, which is of the same size and shape as the cross section of the riser 98. In other embodiments, such as shown in FIGS. 25 and 26, each of the risers 98 may surround multiple ones of the vapor flow apertures 102, each of which is of a smaller size than the cross section of the riser 98. The cross-sectional shape of the risers 98 can be selected from any of various suitable shapes, such as rectangular as shown in FIGS. 22-24, circular as shown in FIG. 27 or square. Similarly, the shape of the vapor flow apertures 102 can be selected from any of various suitable shapes, such as rectangular as shown in FIGS. 22-24, circular as shown in FIGS. 25 and 27, and square as shown in FIG. 26. While the openings 108 in the restrictor plate 384, the vapor flow apertures 102 in the tray deck 100, and the cross section of the risers 98 has the same shape in each of the illustrated embodiments, they may be of different shapes in other embodiments.

The vapor flow restrictors 346 as shown in FIGS. 22-27 and/or as described above may be used with mass transfer assemblies in which the mass transfer structures are other than structured or random packing. For example, as shown in FIG. 29, the vapor flow restrictors 346 are used with mass transfer structures that comprise the cross-flow trays 54 previously described above with respect to FIGS. 2-6.

The mass transfer columns described above may be operated in a method that includes the steps of operating the actuator 70 to move the vapor flow restrictor 46 positioned in the first sub-region 22 between a first orientation that causes a first vapor flow resistance through the first sub-region 22 and a second orientation that causes a second vapor flow resistance through the sub-region 22 that is greater than the first vapor flow resistance to adjust a volumetric split of vapor when ascending through the first and second sub-regions 22 and 24 on the opposite sides of the dividing wall 18. The method includes introducing a feedstream into the open internal region 16, processing the feedstream to cause vapor to ascend through the first and second sub-regions 22 and 24, and withdrawing a product or product from the mass transfer column 10. The feedstream may be one having three or more components and the processing may include separation of the feedstream into high purity components. Similar methods may be practiced with the other embodiments disclosed herein.

From the foregoing, it will be seen that this invention is one well adapted to attain all the ends and objectives hereinabove set forth together with other advantages that are inherent to the structure.

It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative and not in a limiting sense.

The invention claimed is:

1. A mass transfer assembly for use in an open internal region within a mass transfer column, the mass transfer assembly comprising:
    a dividing wall forming first and second sub-regions on opposite sides of the dividing wall;
    one or more zones of mass transfer structures positioned in the sub-regions on the opposite sides of the dividing wall; and
    a vapor flow restrictor positioned in the first sub-region and moveable between a first orientation that causes a first vapor flow resistance through the first sub-region and a second orientation that causes a second vapor flow resistance through the first sub-region that is greater than the first vapor flow resistance to allow an adjustment of a volumetric split of vapor when ascending through the first and second sub-regions on the opposite sides of the dividing wall,
    wherein the vapor flow restrictor comprises a cross-flow tray having a tray deck, vapor flow apertures in the tray deck, and an outlet weir, and wherein when the vapor flow restrictor is in the first orientation the outlet weir extends to a first height above the tray deck and when the vapor flow restrictor is in the second orientation the outlet weir extends to a second height above the tray deck that is greater than the first height.

2. The mass transfer assembly of claim 1, wherein the first vapor flow resistance through the first sub-region is less than or the same as a vapor flow resistance through the second sub-region on the opposite side of the dividing wall and the second vapor flow resistance is greater than the vapor flow resistance through the second sub-region on the opposite side of the dividing wall.

3. The mass transfer assembly of claim 2, wherein the vapor flow restrictor further comprises an actuator associated with the outlet weir for moving the outlet weir between the first and second heights.

4. The mass transfer assembly of claim 3, wherein the outlet weir is pivotably mounted and said actuator is operably coupled with the outlet weir for causing the outlet weir to pivot between the first and second heights above the tray deck.

5. The mass transfer assembly of claim 4, wherein the actuator is selected from the group consisting of a hydraulic actuator, a pneumatic actuator, an electric actuator, a magnetic actuator, and a thermal actuator.

6. The mass transfer assembly of claim 4, wherein the actuator is connected by a linkage that translates a linear movement of the actuator to a rotational movement of the outlet weir about a pivot axis.

7. The mass transfer assembly of claim 4, wherein the mass transfer structures comprise trays, structured packing, random packing, and/or grid packing.

8. The mass transfer assembly of claim 4, further including a second vapor flow restrictor positioned in the second sub-region and moveable between a first orientation that causes a first vapor flow resistance through the second sub-region and a second orientation that causes a second vapor flow resistance through the second sub-region that is greater than the first vapor flow resistance to allow an adjustment of a volumetric split of vapor when ascending through the first and second sub-regions on the opposite sides of the dividing wall.

9. The mass transfer assembly of claim 1, including another one of the dividing walls, wherein the dividing walls are positioned in horizontally spaced-apart and parallel relationship to each other.

10. A mass transfer column comprising:
a shell;
an open internal region defined by said shell; and
a mass transfer assembly of claim 1 positioned within said open internal region.

11. The mass transfer column of claim 10, wherein the first vapor flow resistance through the first sub-region is less than or the same as a vapor flow resistance through the second sub-region on the opposite side of the dividing wall and the second vapor flow resistance is greater than the vapor flow resistance through the second sub-region on the opposite side of the dividing wall.

12. The mass transfer column of claim 11, wherein the vapor flow restrictor further comprises a linear or rotary actuator that is operably associated with the outlet weir and is operable to move the outlet weir between the first and second heights.

13. The mass transfer column of claim 10, including another one of the dividing walls, wherein the dividing walls are positioned in horizontally spaced-apart and parallel relationship to each other.

14. The mass transfer column of claim 10, wherein the vapor flow restrictor further comprises an actuator associated with the outlet weir for moving the outlet weir between the first and second heights.

15. The mass transfer column of claim 14, wherein the actuator is selected from the group consisting of a hydraulic actuator, a pneumatic actuator, an electric actuator, a magnetic actuator, and a thermal actuator.

16. The mass transfer column of claim 14, wherein the outlet weir is pivotably mounted about a pivot axis and said actuator is operably coupled with the outlet weir for causing the outlet weir to pivot about said pivot axis between the first and second heights above the tray deck.

17. The mass transfer column of claim 16, wherein the actuator is connected by a linkage that translates a linear movement of the actuator to a rotational movement of the outlet weir about the pivot axis.

18. The mass transfer column of claim 10, wherein the mass transfer structures comprise trays, structured packing, random packing, and/or grid packing.

19. The mass transfer assembly of claim 18, further including a second vapor flow restrictor positioned in the second sub-region and moveable between a first orientation that causes a first vapor flow resistance through the second sub-region and a second orientation that causes a second vapor flow resistance through the second sub-region that is greater than the first vapor flow resistance to allow an adjustment of a volumetric split of vapor when ascending through the first and second sub-regions on the opposite sides of the dividing wall.

* * * * *